US011665597B2

(12) United States Patent
Gupta et al.

(10) Patent No.: US 11,665,597 B2
(45) Date of Patent: May 30, 2023

(54) UE MOBILITY ACROSS SUPER-CELLS

(71) Applicant: Parallel Wireless, Inc., Nashua, NH (US)

(72) Inventors: Anoop Gupta, Pune (IN); Kartik Shashikant Raval, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/889,202

(22) Filed: Feb. 5, 2018

(65) Prior Publication Data

US 2018/0160337 A1 Jun. 7, 2018

Related U.S. Application Data

(60) Provisional application No. 62/454,633, filed on Feb. 3, 2017.

(51) Int. Cl.
*H04W 36/00* (2009.01)
*H04L 61/3015* (2022.01)
(Continued)

(52) U.S. Cl.
CPC ..... *H04W 36/0016* (2013.01); *H04L 61/3015* (2013.01); *H04W 8/02* (2013.01);
(Continued)

(58) Field of Classification Search
CPC . H04W 36/00; H04W 28/0247; H04W 28/16; H04W 88/16; H04W 36/0016;
(Continued)

(56) References Cited

U.S. PATENT DOCUMENTS 7,170,871 B2 1/2007 Eyuboglu et al.
8,204,022 B2 6/2012 Lassers et al.
(Continued)

FOREIGN PATENT DOCUMENTS

EP 1560378 B1 11/2012
EP 2773151 A1 9/2014
(Continued)

OTHER PUBLICATIONS

Lee Wang, Yongsheng Zhang, Zhenrong Wei, "Mobility Management Schemes at Radio Network Layer for LTE Femtocells," Global Telecommunications Conference, 2007, Globecom '07, IEEE, Washington, DC, USA, Nov. 26-30, 2007.
(Continued)

*Primary Examiner* — Sudesh M Patidar
(74) *Attorney, Agent, or Firm* — Michael Y. Saji; David W. Rouille

(57) ABSTRACT

Systems and methods are disclosed for a 3G gateway. In a first embodiment, a method is disclosed for a network, comprising: receiving a relocation request message at a home nodeB gateway (HNBGW), the HNBGW coupled to an operator core network, the relocation request message including a target super cell identifier and a user equipment (UE) identifier; sending a second relocation request message from the HNBGW to a coordinating node, the coordinating node having as its identifier the target super cell identifier; querying a lookup table at the coordinating node using the UE identifier to determine a target cell identifier; replacing, in the second relocation request message, the target super cell identifier with the target cell identifier to create a third relocation request message; and sending the third relocation request message to a target cell identified by the target cell identifier.

11 Claims, 20 Drawing Sheets

(51) Int. Cl.
   *H04W 36/32* (2009.01)
   *H04W 8/02* (2009.01)
   *H04W 24/02* (2009.01)
   H04W 84/04 (2009.01)
   H04L 67/566 (2022.01)
   H04L 101/375 (2022.01)
   H04L 101/654 (2022.01)

(52) U.S. Cl.
   CPC ....... *H04W 24/02* (2013.01); *H04W 36/0061* (2013.01); *H04W 36/32* (2013.01); *H04L 67/566* (2022.05); *H04L 2101/375* (2022.05); *H04L 2101/654* (2022.05); *H04W 36/00835* (2018.08); *H04W 84/045* (2013.01)

(58) Field of Classification Search
   CPC ....... H04W 36/0061; H04W 36/00835; H04W 36/32; H04W 36/0022; H04W 36/0066; H04W 36/0072; H04W 36/0077; H04W 36/0083; H04W 36/0088; H04W 36/08; H04W 36/10; H04W 36/12; H04W 36/125; H04W 28/021; H04W 28/0226; H04W 28/0815; H04W 28/0975; H04W 28/0983; H04W 24/02; H04W 8/02; H04W 8/085; H04W 8/22; H04W 8/24; H04W 72/0426; H04W 72/0433; H04W 84/045; H04W 84/042; H04W 84/20; H04W 84/22; H04W 4/08; H04W 88/12; H04W 88/14; H04W 88/18; H04W 88/182; H04L 67/2833; H04L 67/1042; H04L 67/1044; H04L 67/2895; H04L 61/6054; H04L 61/3075; H04L 61/3015; H04L 47/125
   USPC .......................................... 370/331; 455/437
   See application file for complete search history.

(56) References Cited

U.S. PATENT DOCUMENTS

| | | | |
|---|---|---|---|
| 8,611,901 B2* | 12/2013 | Pazhyannur | H04W 36/08 455/436 |
| 8,824,430 B2 | 9/2014 | Ioannidis | |
| 8,909,223 B2* | 12/2014 | Abhishek | H04L 12/1836 455/435.1 |
| 9,723,030 B2 | 8/2017 | Hedman et al. | |
| 9,742,535 B2 | 8/2017 | Lorca Hernando | |
| 10,448,258 B2* | 10/2019 | Ahmavaara | H04W 48/10 |
| 2004/0082328 A1 | 4/2004 | Japenga et al. | |
| 2006/0285493 A1 | 12/2006 | Manuja et al. | |
| 2007/0019619 A1 | 1/2007 | Foster et al. | |
| 2007/0213059 A1 | 9/2007 | Shaheen | |
| 2008/0311927 A1 | 12/2008 | Boman et al. | |
| 2009/0213760 A1 | 8/2009 | Shin et al. | |
| 2009/0262703 A1* | 10/2009 | Khetawat | H04W 12/08 370/331 |
| 2010/0130205 A1 | 5/2010 | Jung et al. | |
| 2010/0329210 A1 | 12/2010 | Shirota et al. | |
| 2011/0044285 A1 | 2/2011 | Jang et al. | |
| 2011/0070897 A1 | 3/2011 | Tang et al. | |
| 2012/0082073 A1 | 4/2012 | Andreasen et al. | |
| 2012/0120831 A1 | 5/2012 | Gonsa et al. | |
| 2012/0164979 A1* | 6/2012 | Bachmann | H04W 36/0033 455/411 |
| 2012/0263096 A1 | 10/2012 | Masini et al. | |
| 2012/0269062 A1 | 10/2012 | Cho | |
| 2012/0315956 A1 | 12/2012 | Mochida et al. | |
| 2013/0003697 A1 | 1/2013 | Adjakple et al. | |
| 2013/0077482 A1 | 3/2013 | Krishna et al. | |
| 2013/0143563 A1 | 6/2013 | Singh et al. | |
| 2013/0150056 A1 | 6/2013 | Yi et al. | |
| 2013/0182655 A1 | 7/2013 | Das et al. | |
| 2013/0188499 A1 | 7/2013 | Mach et al. | |
| 2013/0272274 A1 | 10/2013 | Ishida et al. | |
| 2013/0294403 A1* | 11/2013 | Srinivasan | H04W 88/12 370/331 |
| 2013/0329567 A1 | 12/2013 | Mathias et al. | |
| 2014/0016614 A1 | 1/2014 | Velev et al. | |
| 2014/0050208 A1 | 2/2014 | Annaluru et al. | |
| 2014/0064156 A1 | 3/2014 | Paladugu et al. | |
| 2014/0073304 A1 | 3/2014 | Brisebois et al. | |
| 2014/0226513 A1 | 8/2014 | Hapsari et al. | |
| 2014/0233386 A1 | 8/2014 | Jamadagni et al. | |
| 2014/0241316 A1* | 8/2014 | Okmyanskiy | H04W 36/0083 370/331 |
| 2014/0308959 A1 | 10/2014 | De Benedittis et al. | |
| 2015/0056995 A1 | 2/2015 | Baillargeon | |
| 2015/0063295 A1 | 3/2015 | Himayat et al. | |
| 2015/0065135 A1 | 3/2015 | Claussen et al. | |
| 2015/0173011 A1* | 6/2015 | Das | H04W 24/02 370/328 |
| 2015/0207700 A1 | 7/2015 | Elmdahl et al. | |
| 2015/0257051 A1* | 9/2015 | Rao | H04W 36/0066 455/439 |
| 2015/0282010 A1 | 10/2015 | Yang et al. | |
| 2015/0358956 A1 | 12/2015 | Choi et al. | |
| 2015/0359020 A1 | 12/2015 | Reynaud et al. | |
| 2016/0073312 A1 | 3/2016 | Sridhar | |
| 2016/0080431 A1 | 3/2016 | Reddy et al. | |
| 2016/0142952 A1* | 5/2016 | Nakata | H04W 36/04 455/438 |
| 2016/0227449 A1 | 8/2016 | Sivavakeesar et al. | |
| 2016/0323787 A1 | 11/2016 | Nanri et al. | |
| 2016/0323788 A1 | 11/2016 | Nanri et al. | |
| 2016/0337918 A1* | 11/2016 | Brock | H04W 36/0022 |
| 2016/0381662 A1* | 12/2016 | Wang | H04W 12/00 370/329 |
| 2017/0055238 A1 | 12/2017 | Grayson et al. | |
| 2018/0027460 A1 | 1/2018 | Zhang | |

FOREIGN PATENT DOCUMENTS

| | | |
|---|---|---|
| WO | 9515665 A1 | 6/1995 |
| WO | 2011/075467 A1 | 6/2011 |
| WO | 2012120519 A1 | 9/2012 |
| WO | 2014207712 A1 | 12/2014 |
| WO | 2015046104 A1 | 4/2015 |
| WO | 2016083524 A1 | 6/2016 |
| WO | 2018104769 A1 | 6/2018 |

OTHER PUBLICATIONS

Telefonaktiebolaget L. M. Ericsson, "Tdoc 2B00-019: Target Id for Handover to UMTS," ETSI STC SMG2 Meeting, Copenhagen, Mar. 6-8, 2000.

Third Generation Partnership Project, "3rd Generation Partnership Project; Technical Specification Group Radio Access Network; UTRAN architecture for 3G Home Node B (HNB); Stage 2 (Release 10)," 3GPP TS 25.467 V10.1.0 (Mar. 2011).

Third Generation Partnership Project, "3rd Generation Partnership Project; Technical Specification Group Radio Access Network; UTRAN Iuh interface Home Node B (HNB) Application Part (HNBAP) signalling (Release 13)," 3GPP TS 25.469 V13.1.0 (Mar. 2011).

"SRNS Relocation (UE connected to combined CN element," Telecom Modus, TSG-RAN WG3 Meeting#1, Bonn, Germany, Feb. 2-5, 1999.

Mat Leaver, "Small Cells," Oct. 2011, Alcatel-Lucent.

"NEC Femtocell Solution Radio Access Network Features," Jan. 5, 2011, NEC.

Alessandro Guerrieri, "WCDMA RAN IP Backhauling: TIM Network Architecture and Synchronization Aspects," TIM Network Architecture and Synchronization Aspects, ITSF 09—Time & Sync in Telecoms, Nov. 3-5, 2009.

Third Generation Partnership Project, "3rd Generation Partnership Project; Technical Specification Group Core Network and Terminals; Numbering, addressing and identification (Release 13)," 3GPP TS 23.003 V13.4.0 (Dec. 2015).

(56) References Cited

OTHER PUBLICATIONS

Third Generation Partnership Project, "3rd Generation Partnership Project; Technical Specification Group Radio Access Network; UTRAN overall description (Release 8)," 3GPP TS 25.401 V8.2.0 (Dec. 2008).
Third Generation Partnership Project, "3rd Generation Partnership Project; Technical Specification Group Radio Access Network; UTRAN Iu interface Radio Access Network Application Part (RANAP) signaling (Release 13)," 3GPP TS 25.413 V13.0.0 (Dec. 2015).
Third Generation Partnership Project, "3rd Generation Partnership Project; Technical Specification Group Radio Access Network; UTRAN architecture for 3G Home Node B (HNB); Stage 2 (Release 11)," 3GPP TS 25.467 V11.1.0 (Dec. 2012).
Third Generation Partnership Project, "3rd Generation Partnership Project; Technical Specification Group Radio Access Network; UTRAN architecture for 3G Home NodeB; Stage 2 (Release 8)," 3GPP TS 25.467 V8.1.0 (Mar. 2009).
Third Generation Partnership Project, "3rd Generation Partnership Project; Technical Specification Group Radio Access Network; UTRAN Iuh Interface RANAP User Adaption (RUA) signalling (Release 10)," 3GPP TS 25.468 V10.1.0 (Mar. 2011).
Third Generation Partnership Project, "3rd Generation Partnership Project; Technical Specification Group Radio Access Network; UTRAN Iuh interface Home Node B (HNB) Application Part (HNBAP) signalling (Release 13)," 3GPP TS 25.469 V13.0.1 (Jan. 2016).
Third Generation Partnership Project, "3rd Generation Partnership Project; Technical Specification Group Core Network and Terminals; General Packet Radio Service (GPRS); GPRS Tunnelling Protocol (GTP) across the Gn and Gp interface (Release 10)," 3GPP TS 29.060 V10.1.0 (Mar. 2011).
Third Generation Partnership Project, "3rd Generation Partnership Project; Technical Specification Group Core Network and Terminals; General Packet Radio System (GPRS) Tunnelling Protocol User Plane (GTPv1-U) (Release 9)," 3GPP TS 29.281 V9.2.0 (Mar. 2010).
European Telecommunications Standards Institute, Digital cellular telecommunications system (Phase 2+); Universal Mobile Telecommunications System (UMTS); Numbering, addressing and identification (3GPP TS 23.003 version 9.15.0 Release 9), ETSI TS 123 003 V9.15.0 (Oct. 2014).
Cisco Systems: "Communications Transformations: Implementation Considerations when Enhancing Enterprise Communications Solutions with SIP Trunks", Jan. 1, 2007, pp. 1-19.
Meinesz, et al.: "A fixed network design for site diversity enhanced wireless access", Vehicular Technology Conference, 1999. VTC 1999—Fall. IEEE VTS 50th Amsterdam, Netherlands Sep. 19-22, 1999, Piscataway, NJ, USA, IEEE, US, vol. 2, Sep. 19, 1999 (Sep. 19, 1999), pp. 1033-1037.

* cited by examiner

UE MOBILITY ACROSS SUPER-CELLS

CROSS-REFERENCE TO RELATED APPLICATIONS

This application claims priority under 35 U.S.C. § 119(e) to U.S. Provisional Pat. App. No. 62/454,633, filed Feb. 3, 2017 which is hereby incorporated by reference in its entirety for all purposes. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015, each in its entirety for all purposes. This document also hereby incorporates by reference U.S. Pat. Nos. 9,107,092, 8,867,418, and 923,547 in their entirety. This document also hereby incorporates by reference U.S. patent application Ser. No. 14/822,839 in its entirety.

BACKGROUND

The Universal Mobile Telecommunications System (UMTS) is a third generation (3G) mobile cellular system for networks based on the GSM standard. Developed and maintained by the 3GPP (3rd Generation Partnership Project), UMTS is a component of the International Telecommunications Union IMT-2000 standard set and compares with the CDMA2000 standard set for networks based on the competing 3G cdmaOne technology. UMTS uses wideband code division multiple access (W-CDMA) radio access technology (RAT) to offer greater spectral efficiency and bandwidth to mobile network operators. UMTS uses an interface called Iub between the cellular base station and the radio network controller (RNC) in the core network, which enables the RNC to perform the majority of required functions, and for the cellular base station, or nodeB, to perform primarily radio transceive, baseband and analog-digital conversion functions.

A femtocell is a small, low-power cellular base station, typically designed for use in a home or small business. A broader term which is more widespread in the industry is small cell, with femtocell as a subset. A femtocell may connect to the service provider's network via broadband (such as DSL or cable); typical designs support four to eight simultaneously active mobile phones in a residential setting depending on version number and femtocell hardware, and eight to 16 mobile phones in enterprise settings. A femtocell allows service providers to extend service coverage indoors or at the cell edge, especially where access would otherwise be limited or unavailable. Although much attention is focused on WCDMA, the concept is applicable to all standards, including GSM, CDMA2000, TD-SCDMA, WiMAX and LTE solutions.

The key interface in femtocell architectures is that between the femtocells and the femtocell gateway. Standardisation enables a wider choice of femtocell products to be used with any gateway, increasing competitive pressure and driving costs down. For the common WCDMA femtocells, this is defined as the Iuh interface. In the Iuh architecture, the femtocell gateway sits between the femtocell and the core network and performs the necessary translations to ensure the femtocells appear as a radio network controller (RNC) to existing mobile switching centres (MSCs). Each femtocell talks to the femtocell gateway and femtocell gateways talk to the Core Network Elements (CNE) (MSC for circuit-switched calls, SGSN for packet-switched calls).

BRIEF DESCRIPTION OF DRAWINGS

FIG. 16 is split into FIGS. 16A and 16B.

SUMMARY

Figure 1A:
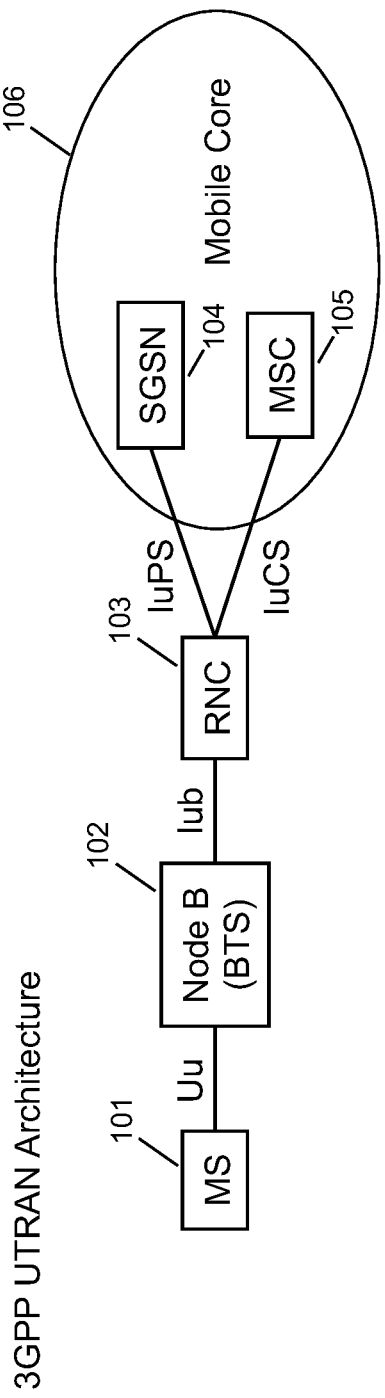
FIGS. 1A and 1B are network architecture diagrams for prior art 3GPP 3G networks.

In a first embodiment, a method is disclosed for a network, comprising: receiving a relocation request message at a home nodeB gateway (HNBGW), the HNBGW coupled to an operator core network, the relocation request message including a target super cell identifier and a user equipment (UE) identifier; sending a second relocation request message from the HNBGW to a coordinating node, the coordinating node having as its identifier the target super cell identifier; querying a lookup table at the coordinating node using the UE identifier to determine a target cell identifier; replacing, in the second relocation request message, the target super cell identifier with the target cell identifier to create a third relocation request message; and sending the third relocation request message to a target cell identified by the target cell identifier.

The method may further comprise receiving the relocation request message at the HNBGW via a signaling connection between the target small cell and the coordinating node. The method may further comprise proxying requests at the coordinating node to relocate the UE to the target cell. The UE identifier may be an international mobile subscriber identity (IMSI). The coordinating node may be a virtualization server configured to act as a proxy and back-to-back user agent for connecting a plurality of small cells to the operator core network. The coordinating node maintains a list of cell identifiers for a plurality of small cells. The coordinating node may be a home eNodeB gateway (HeNBGW).

In a second embodiment, a method may be disclosed, comprising: receiving a request from a home NodeB gateway (HNBGW) at a coordinating node, the handover request having a user equipment (UE) identifier and having as a destination address an address managed by the coordinating node; querying a lookup table at the coordinating node using the UE identifier to retrieve a target cell identifier of a target cell, visibility of the target cell being managed by the coordinating node; swapping, in a message, the destination address for the target cell identifier; and forwarding the message to the coordinating node to be further forwarded to the target cell.

The address managed by the coordinating node may be a radio network controller (RNC) identifier. The request may be a handover request or a radio access network application part (RANAP) relocation request. The UE identifier may be an international mobile subscriber identity (IMSI) and The coordinating node may be a virtualization server configured to act as a proxy and back-to-back user agent for connecting a plurality of small cells to the operator core network, and The coordinating node may be a home eNodeB gateway (HeNBGW).

DETAILED DESCRIPTION

Overview

Through its HetNet Gateway (HNG) (TM), the Parallel Wireless solution can orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is 100 percent compliant with all open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and WiFi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF).

Paired with the Parallel Wireless HNG, the Parallel Wireless base station, the Converged Wireless System (CWS) (TM), is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization.

This disclosure covers a 3G vRNC/HNBGW solution provided by the Parallel Wireless HNG. This disclosure also captures architecture and call flow details for an IuGw feature. The proposed IuGw sits in between a base station, such as the Parallel Wireless CWS (which acts as an HNB), and a core network, which may include an external HNBGW on the Iuh interface. To the CWS (HNB) the IuGW acts as and virtualizes an HNBGW, and to HNBGW it acts as a virtual HNB. The system is generalizable to provide interoperability among any-G RAN access nodes with various combinations of core networks, including with a combined 3G and a 4G core network.

Architecture with an IuGw plus Tub over IP to MSC.

Using the architecture described herein, it is possible to enable 3G packet and circuit calling and data over IP with a flexible and scalable architecture. A gateway, called variously the Parallel Wireless HNG or Parallel Wireless HNG, acts as a 3G radio network controller (RNC) and provides one or more virtualized nodeBs as needed using grouping and mapping. It interfaces with an existing MSC, SGSN via IuCS, IuPS, in some embodiments. The advantages of this architecture include the helpful features of virtualized cells, here, virtual nodeBs, as with the Parallel Wireless LTE virtualization scheme. Also, significantly, using this architecture it is possible to provide an all-IP RAN, with fewer legacy interfaces provided at the core network. This architecture may be adapted for various use cases: emergency services, Band 14 services, multi-operator core networks (MOCN). Iu-Flex can be used for 3G MOCN or multi-MSC, or to provide resiliency across data centers.

As compared to the use of femto cells in an existing network, CWS is very different from femto in scale, RF power/coverage area and capabilities; femto needs external AAA but this architecture does not; femto capacity is additive on top of current network, as opposed to no additional cost with Parallel Wireless HNG; with Parallel Wireless HNG connecting to MSC/SGSN it can provide better 911/LBS solution; simplified network architecture at low cost/Cleaner integration; and this CWS/Parallel Wireless HNG solution is not a femto solution hence does not need femto GW. The CWS solution is ideal for a greenfield scenario, providing both 3G and 4G connectivity, in conjunction with the Parallel Wireless HetNet Gateway. However, the CWS and HNG may also be leveraged to provide effective brownfield network architectures. In other words, in a greenfield scenario, it is possible to convert any-G to proprietary Iuh.

The following references are incorporated by reference in their entirety: UTRAN Overall Description—3GPP TS 25.401 V8.2.0 (2008-12) [1]; UTRAN Architecture for 3G Home Node B—3GPP TS 25.467 V.8.10 (2009-03) [2]; 3GPP TS 29.281 GPRS Tunneling Protocols—User Plane (GTP-U) [3]; 3GPP TS 29.060 GPRS Tunneling Protocol [4]; 3GPP TS 25.413 RANAP Signalling [5]; 3GPP TS 23.003 Numbering, Addressing and Identification [6]; 3GPP TS 25.468—UTRAN Iuh Interface RANAP User Adaption (RUA) Signaling [7]; 3GPP TS 25.469—UTRAN Iuh Interface RANAP User Adaption (HNBAP) Signaling [8].

Figure 1B:
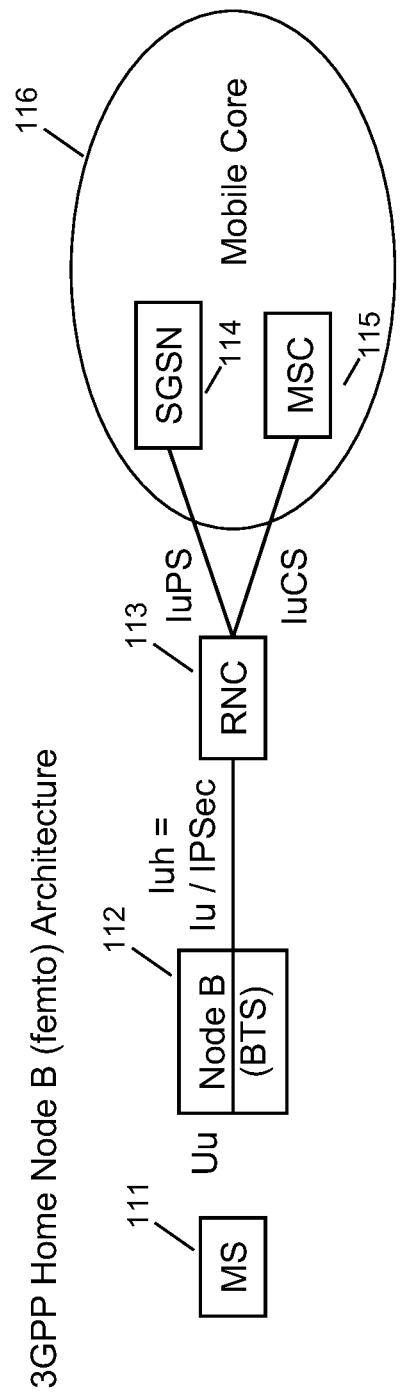

FIGS. 1A and 1B are network architecture diagrams for prior art 3GPP 3G networks. FIG. 1A shows a 3GPP UTRAN architecture. FIG. 1B shows a 3GPP Home NodeB (femto) architecture. As shown in FIG. 1A, the 3GPP UTRAN architecture includes a mobile station 101, a nodeB 102 (also known as a base transceiver station or BTS), a radio network controller (RNC) 103, and a mobile core 106, the mobile core including a serving GPRS support node (SGSN) 104 and a mobile switching center (MSC) 105. The RNC performs functions that include radio resource control, assigning scrambling codes to UEs, power control, ciphering, Kasumi (UE to RNC; note that nodeB connection is not assumed to be secure), and other functions. The MSC acts as a telephone exchange that makes the connection between mobile users within the network, from mobile users to the public switched telephone network and from mobile users to other mobile networks. The MSC also administers handovers to neighbouring base stations, keeps a record of the location of the mobile subscribers, is responsible for subscriber services and billing. The Serving GPRS Support Node (SGSN) is a main component of the GPRS network, which handles all packet switched data within the network, e.g. the mobility management and authentication of the users. The SGSN performs the same functions as the MSC for voice traffic. Between the MS 101 and nodeB 102 is a Uu air interface, between the nodeB and the RNC is an Iub interface, and between the RNC and the core are two interfaces, IuPS and IuCS. IuPS is the interface used for packet-switched connections. IuCS is the interface used for circuit-switched connections, which in 3G include phone calls.

FIG. 1B shows a 3GPP femto architecture, which is similar to FIG. 1A. This architecture includes a mobile station 111, a nodeB 112 (also known as a base transceiver station or BTS), a radio network controller (RNC) 113, and a mobile core 116, the mobile core including a serving GPRS support node (SGSN) 114 and a mobile switching center (MSC) 115. While the Uu interface is unchanged, the interface between the BTS and RNC is Iuh instead of Iub, and also includes an IPsec tunnel between the nodes. The Iub interface is an interface and protocol that allows a macro base station to control the majority of the functions of a nodeB, except baseband and analog-digital conversion. Iub includes control mechanisms to allow an RNC to directly control a NodeB to do all of the following: resource management; scheduling; encryption/decryption; power control; etc. In 3GPP, a regular nodeB does not perform encryption. Iub can be used over IP transport. Iuh is a more lightweight protocol allowing for, e.g., radio resource management at a HNB or femto cell itself. While it is useful to enable a base station to But for carriers with existing macros deployed, it does not make sense to switch already-deployed macro base stations using Iub to Home nodeBs using Iuh; as well, macro base stations have coverage advantages. However, the two interfaces are similar because both Iub and Iuh terminate at a RNC.

Figure 2:
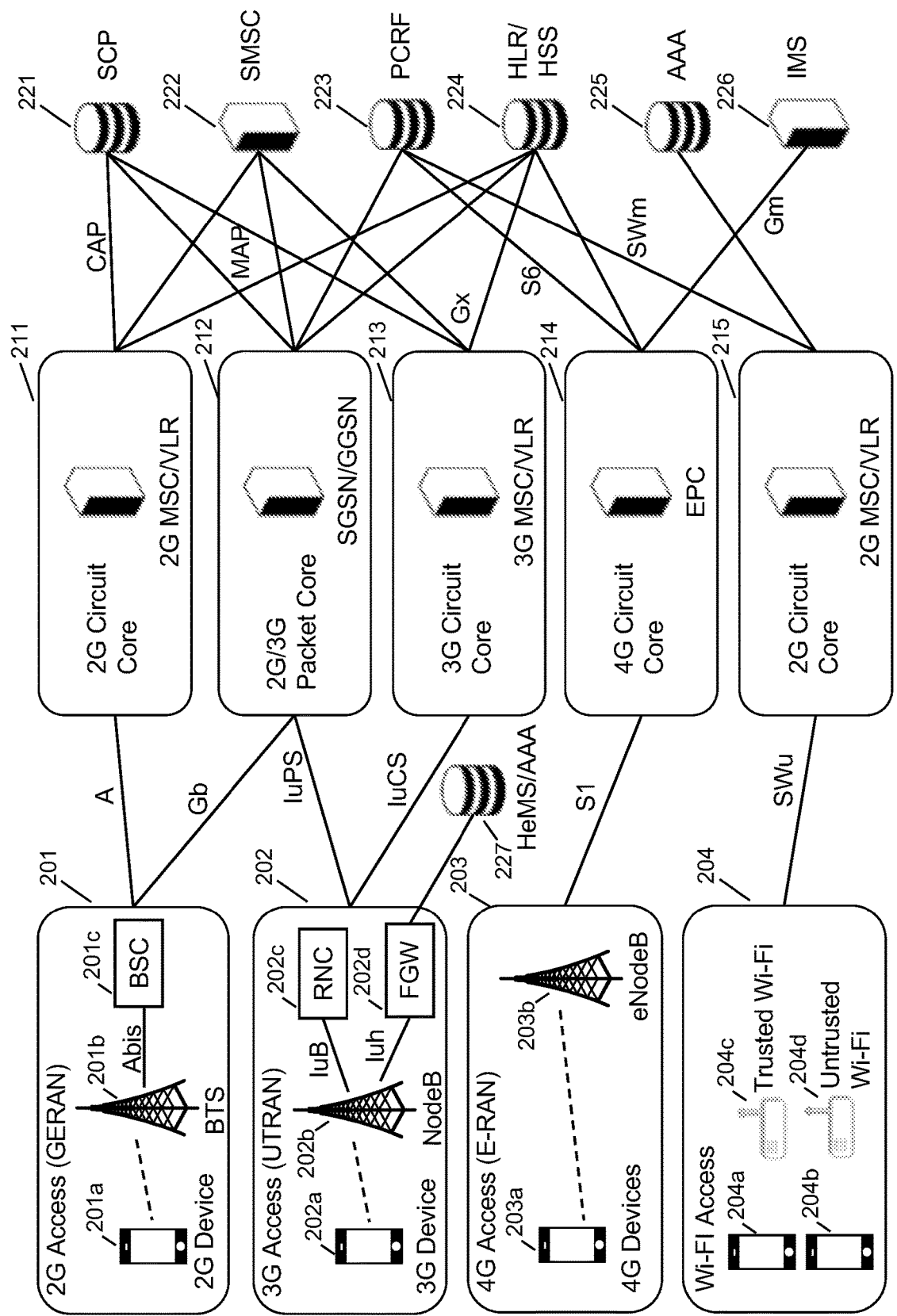
FIG. 2 is a schematic network architecture diagram for 3G and other-G prior art networks.

FIG. 2 is a schematic network architecture diagram for 3G and other-G prior art networks. The diagram shows a plurality of "Gs," including 2G, 3G, 4G, and Wi-Fi. 2G is represented by GERAN 201, which includes a 2G device 201a, BTS 201b, and BSC 201c. 3G is represented by UTRAN 202, which includes a 3G UE 202a, nodeB 202b, RNC 202c, and femto gateway (FGW, which in 3GPP namespace is also known as a Home nodeB Gateway or HNBGW) 202d. 4G is represented by EUTRAN 203, which includes an LTE UE 203a and LTE eNodeB 203b. Wi-Fi is represented by Wi-Fi access network 204, which includes a trusted Wi-Fi access point 204c and an untrusted Wi-Fi access point 204d. The Wi-Fi devices 204a and 204b may access either AP 204c or 204d. In the current network architecture, each "G" has a core network. 2G circuit core network 211 includes a 2G MSC/VLR; 2G/3G packet core network 212 includes an SGSN/GGSN (for EDGE or UMTS packet traffic); 3G circuit core 213 includes a 3G MSC/VLR; 4G circuit core 214 includes an evolved packet core (EPC); and in some embodiments the Wi-Fi access network may be connected via a 2G circuit core 215 with a 2G MSC/VLR. Each of these nodes are connected via a number of different protocols and interfaces, as shown, to other, non-"G"-specific network nodes, such as the SCP 221, the SMSC 222, PCRF 223, HLR/HSS 224, Authentication, Authorization, and Accounting server (AAA) 225, and IP Multimedia Subsystem (IMS) 226. An HeMS/AAA 227 is present in some cases for use by the 3G UTRAN. The diagram is used to indicate schematically the basic functions of each network as known to one of skill in the art, and is not intended to be exhaustive. Noteworthy is that the RANs 201, 202, 203, 204 rely on specialized core networks 211, 212, 213, 214, 215, but share essential management databases 221, 222, 223, 224, 225, 226. More specifically, for the 2G GERAN, a BSC 201c is required for Abis compatibility with BTS 201b, while for the 3G UTRAN, an RNC 202c is required for Iub compatibility and an FGW 202d is required for Iuh compatibility.

Figure 3:
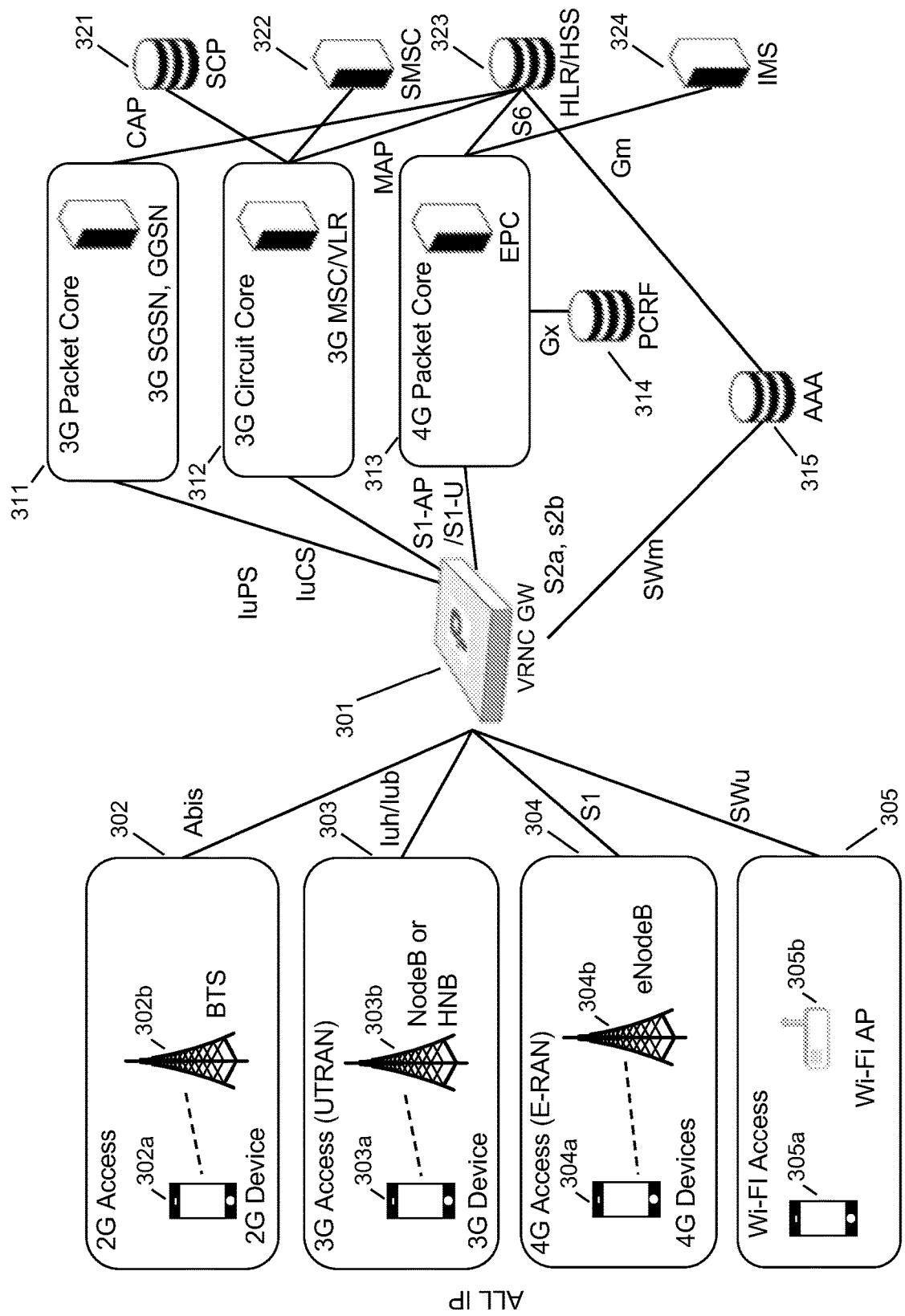
FIG. 3 is a schematic network architecture in accordance with some embodiments.

FIG. 3 is a schematic network architecture in accordance with some embodiments. The architecture shown is an exemplary "brownfield" deployment architecture, i.e., an architecture being deployed using existing equipment and assets, and adds a virtual RNC gateway (VRNCGW) 301, which can be a Parallel Wireless HetNet Gateway, or other virtualizing, coordinating, and base station managing node. 2G RAN (GERAN) 302, with mobile station (MS) 302a and BTS 302*b*, is represented, but an Abis interface is made directly between GERAN 302 and gateway 301. 3G RAN (UTRAN) 303, with UE 303*a* and base station 303*b*, connects directly to gateway 301 via Iuh or Iub without an RNC, as the gateway handles the RNC functions. If a nodeB is used, the Iub protocol may be used; if a home NodeB or femto is used, the Iuh protocol may be used. 4G RAN (EUTRAN) 304 is represented by UE 304*a* and eNodeB 304*b*, which communicates via S1 to the gateway 301; S1 is the protocol/interface used for eNodeBs in communicating with the LTE base station managing node, the MME. A Wi-Fi RAN 305, including Wi-Fi device 305*a* and AP 305*b*, using SWu, is also directly connected to VRNCGW 301, which permits it to be part of the mobile operator network. Instead of SWu, S2*a* and S2*b* may also be used; S2*a* may be used by/for a trusted wireless access gateway (TWAG), and provides a single IPsec tunnel, while S2*b* is used for interacting as an evolved packet data gateway (ePDG), which is an untrusted gateway that permits multiple IPsec sessions to be opened.

Gateway 301 handles all protocol communications with the inner core network. It may send 3G sessions to either the 3G packet core 311 or the 3G circuit core 312, or 4G sessions to the 4G packet core 313, or circuit-switched fallback (CSFB) sessions to 3G circuit core 312. Authentication, location registration, or packet-based VoIP etc. is handled according to the prior art by PCRF 314, AAA 315, SCP 321, SMSC 322, HLR/HSS 323, IMS 324 as usual. By the action of the gateway 301 as a virtualizing proxy, extraneous details of the RAN are hidden from the core network and vice versa. The gateway is also enabled to perform steering or slicing as appropriate, so that certain UEs or base stations can be directed to other "Gs" (RANs) or resources can be split among networks. The 2G GERAN core network has been eliminated, as all 2G sessions can be handled by the 3G core. Although the legacy GERAN requires that the gateway 301 use Abis, the core network may view the legacy 2G MS's as 3G UEs. The VRNC may provide both a virtual RNC and a HNBGW, in some embodiments, thus enabling RAN virtualization and coordination for both 3G and 4G nodes. The VRNC may also provide a virtual BSC in some embodiments for legacy GERAN base stations.

This architecture has the following advantages and characteristics, in some embodiments. By having the different RANs share a single gateway and by having UEs/MS's share core networks, less complexity is required in the core and operators are not required to keep multiple core networks active. A heterogeneous network is enabled to be used efficiently. As well, although implementation of the gateway 301 requires increased complexity, this results in additional potential for features to be added, such as coordination features across RAN technologies. By terminating connections, lower-layer encryption is typically not in place, allowing for deep packet inspection and lawful intercept (although application-layer encryption is still potentially in place).

Figure 4:
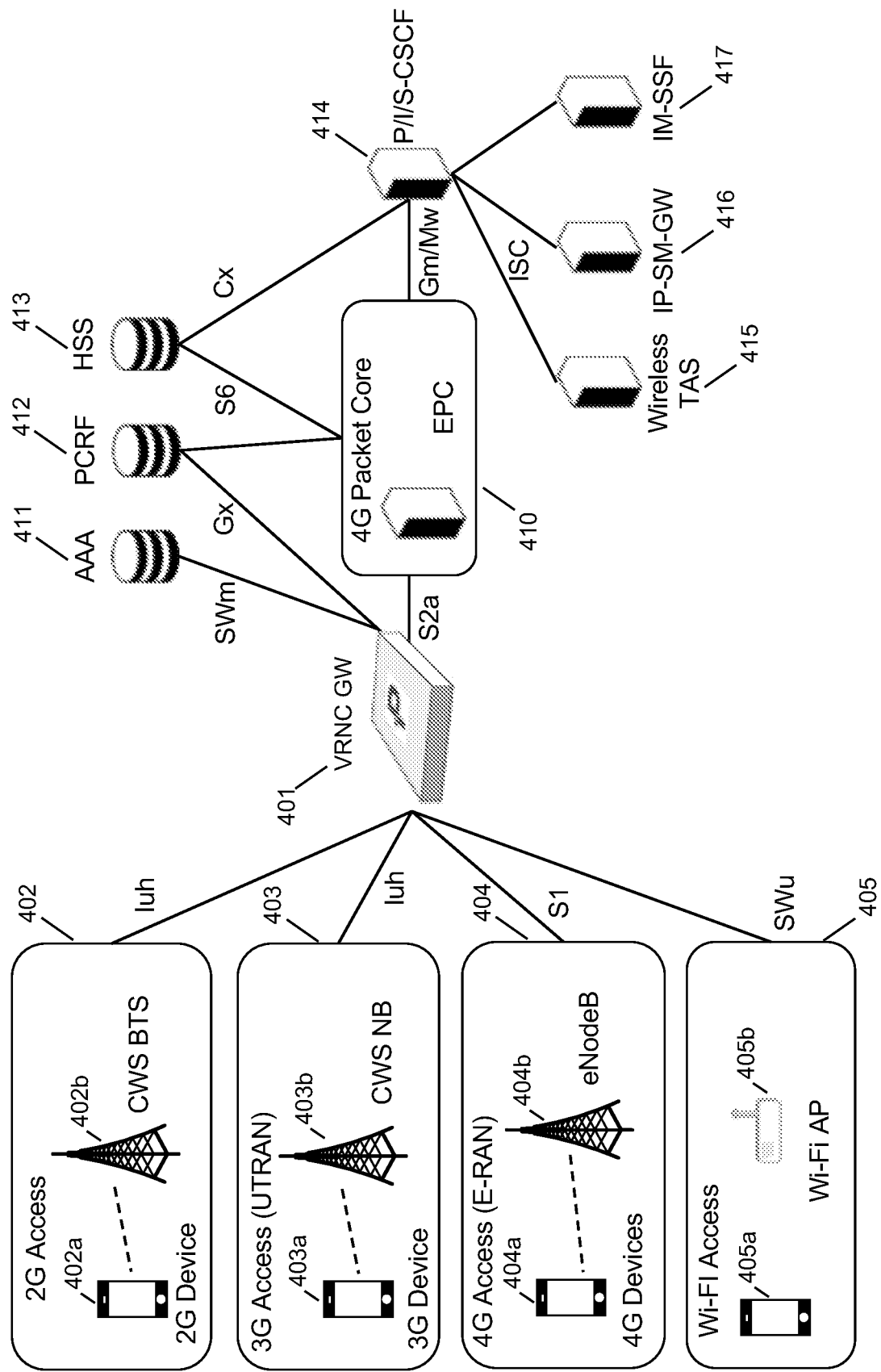
FIG. 4 is a schematic network architecture in accordance with some further embodiments.

FIG. 4 is a schematic network architecture in accordance with some further embodiments. The architecture shown is an exemplary "greenfield" deployment architecture, i.e., an architecture being deployed with new purchases of equipment to provide coverage in areas previously not served by existing equipment. 2G GERAN 402, with MS 402*a*, BTS 402*b*; 3G UTRAN 403, with UE 403*a* and nodeB 403*b*; 4G EUTRAN 404, with UE 404*a* and eNodeB 404*b*; and Wi-Fi access network 405, with mobile device 405*a* and AP 405*b*, are still present and each continue to go through VRNCGW 401. However, in this configuration it is not necessary to provide a 3G packet core or circuit core. Instead, a 4G packet core 410 is provided, as well as functions for enabling the 4G core: AAA 411, PCRF 412, HSS 413, and IMS nodes P/I/S-CSCF 414, wireless TAS 415, IP-SM-GW 416, and IM-SSF 417. The IMS core provides voice calling functions and the 4G packet core provides data calling functions.

VRNCGW 401 enables this core network simplification in conjunction with enhanced base stations in the RAN. Instead of legacy 2G and 3G base stations, Parallel Wireless CWS/BTS 402*b* and Parallel Wireless CWS/nodeB 403*b* provide additional functionality. CWS/BTS 402*b* communicates with 2G MS 402*a* using an A interface, but instead of requiring Abis, CWS 402*b* may interwork the A interface and provide voice calling using RTP and SIP via IMS, thus requiring only a standard packet-switched session that 4G core network 410 can provide. Parallel Wireless CWS/nodeB 403*b* may interwork CS sessions similarly to IMS. CWS/BTS 402*b* and CWS/nodeB 403*b* both only require Iuh to be handled by VRNCGW 401, such that the VRNCGW is required only to use Iuh and S1/S2/SWu.

Although not shown, it is apparent that this network architecture is flexible and accommodates a variety of configurations. The general approach being used here is to provide a stateful proxy at the gateway that is capable of handling a particular protocol/interface. Since the gateway sits at the center of the network for both the RAN (and therefore the UE or mobile device) and the core network, the stateful proxy can have appropriate knowledge about the messages that have been sent. The stateful proxy can also suppress messages, change headers, insert messages, or perform other proxy functions. A finite state machine (FSM) may be used for handling state, which may be tracked for mobile devices (MS, UE, etc.) or base stations (nodeB, ENB, HENB, Wi-Fi AP, etc.) as well as the core network nodes themselves.

In some embodiments, methods for coordinating between base stations are also available using X2, Iur, and Iurh protocols. The X2 interface is used between 4G eNodeBs. The Iur interface is used between RNCs. Using the VRNCGW as a proxy and gateway, the VRNCGW may be able to provide Iur-based nodeB coordination with other RNCs, as well as interworking between X2 and Iur for heterogeneous RAT coordination. The VRNCGW may also use Iurh interface to exchange coordination information with home nodeBs as a HNBGW. This type of signaling enables features such as soft handover, direct handover, COMP, ICIC, and others. Proxying and aggregation of these interfaces at the VRNCGW has also been considered.

Figure 5:
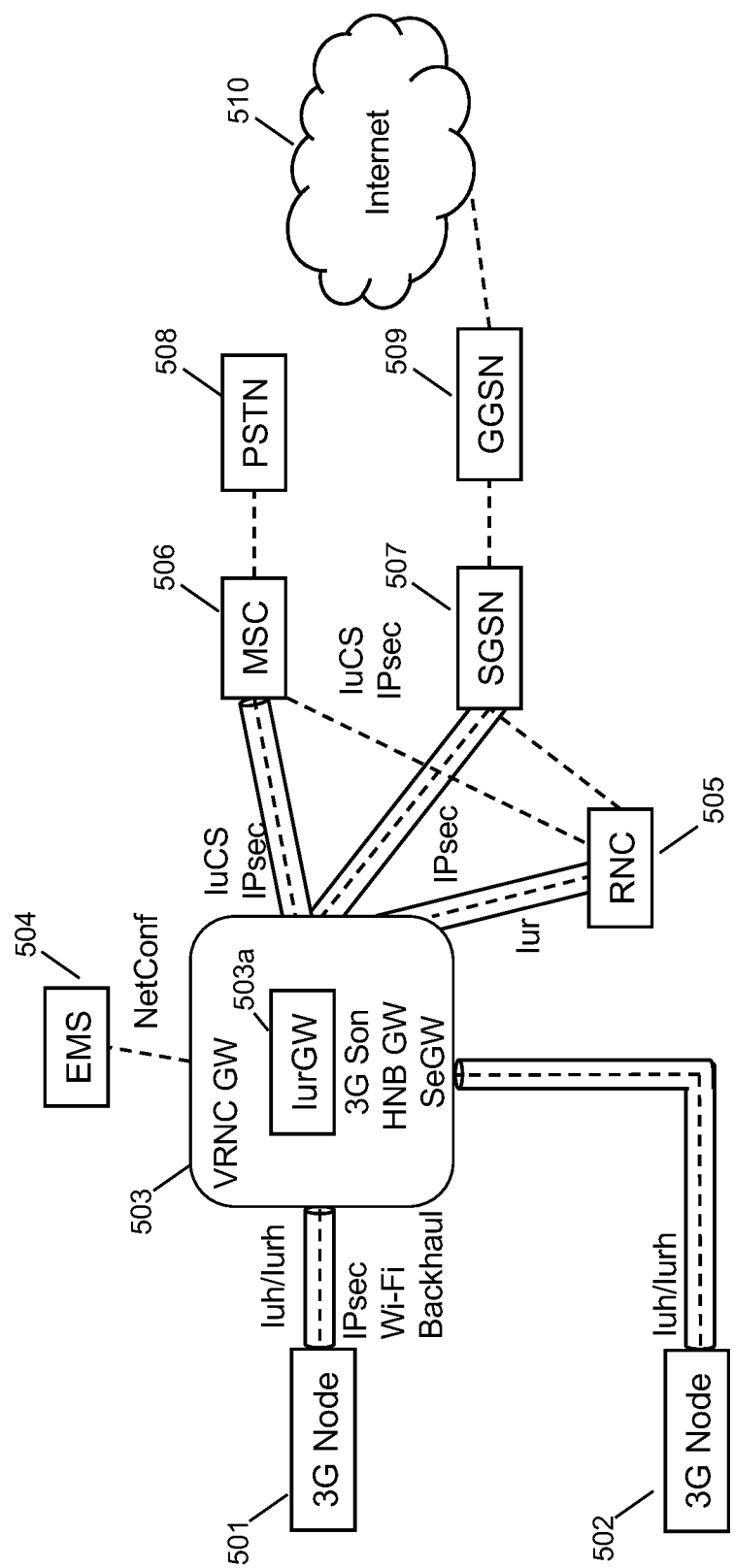
FIG. 5 is a schematic network architecture showing security and signaling characteristics in accordance with some embodiments.

FIG. 5 is a schematic network architecture showing security and signaling characteristics in accordance with some embodiments. 3G nodeBs 501 and 502 are connected via Iuh/Iurh to VRNCGW 503. An enhanced messaging service (EMS) server 504 is also connected to VRNCGW 503 for providing text messaging and other services. VRNCGW provides 3G self-organizing network (SON) capability, HNBGW capability, and security gateway capability to RANs 501 and 502. RAN 501 is connected over a Wi-Fi backhaul link; RAN 502 is connected via a physical link or another link. Both RAN 501 and 502 have opened IPsec tunnels to VRNCGW 503, which terminates the tunnels and decrypts the contents. VRNCGW 503, via its security gateway (SeGW), then takes the output of the tunnels and sends them via additional IPsec tunnels that connect to, in this particular network configuration, an RNC 505 (via Iur for inter-RNC coordination), an SGSN 507 (via IuPS for delivery of packet traffic), and an MSC 506 (via IuCS for delivery of circuit-switched calls). These nodes 505, 506, 507 are in the 3G core network, and no additional security is needed between these nodes and other nodes in the core network. MSC 506 connects to the regular telephone network, e.g., the PSTN 508, to provide call connectivity. SGSN 507 connects to GGSN 509, which connects to the public Internet 510.

Components

The Parallel Wireless solution may include the following components:

Converged Wireless System (CWS)—the CWS component is a multi-technology base station with an integrated backhaul (wired, microwave, mesh and LTE) that supports LTE, and LTE Advanced, 3G, and Wi-Fi access, simultaneously. The CWS series is available in different form factors such as outdoor, in-vehicle small cell, and indoor.

HetNet Gateway—the HetNet Gateway (Parallel Wireless HNG) is a carrier-grade server that is NFV/SDN-based, 3GPP-compliant RAN orchestrator that enables RAN hyperconnectivity by unifying any technology (3G, 4G, Wi-Fi), any vendor RAN by presenting it as one common interface to the core. Parallel Wireless HNG logically sits between the RAN and the core and abstracts the RAN on COTS hardware while making the RAN self-configuring, self-optimizing, and self-healing. To provide hyperconnectivity and to manage the RAN in real-time, the Parallel Wireless HNG combines these virtualized network functions: virtual-eNB, HeNBGW, X2 gateway, HNBGW/vRNC, ePDG, TWAG/SaMOG, SON server, edge/cell site aggregation, and the security gateway. It is also an Internet of Things (IoT) enabler, and eMBMS enabler by adding MCE and MBMS-GW functionality and analytics. It optimizes the signaling and data traffic going to core network to allow operators to scale the network to meet growing capacity demands at low cost. In an LTE network, the HetNet Gateway (Parallel Wireless HNG) node logically sits between the eNodeBs and the MNO Evolved Packet Cores (EPCs). It orchestrates thousands of base stations to look like a single one to the MNO packet core. The Parallel Wireless HNG virtualizes the radio network resources such as eNodeBs and backhaul and makes them self-configurable and self-adjustable. It acts as HeNBGW and vRAN/virtualENB. It allows plug and play operation of CWS nodes and mesh backhaul, and allows them to form an ad hoc network as the nodes come in to the network and leave. In a 3G network, the Parallel Wireless HNG provides the Home Node B Gateway and virtual RNC functionality. For Wi-Fi, the Parallel Wireless HNG acts as a Wireless LAN Controller (WLC), Evolved Packet Data Gateway (ePDG) and Trusted Wireless Access Gateway (TWAG). These are all configurable options and one or the other can be configured based on an operator's requirements. In some configurations Parallel Wireless HNG also acts as an EPC. The HetNet Gateway sits between the RAN and the core network, and as a result is in a position to provide proxying and virtualization for any-G and for any core or multiple cores, as well as being able to perform deep packet inspection and lawful intercept for data flowing through the network that would be encrypted if intercepted at a different point in the network.

Uni-Manage—the Uni-Manage software is an Element Management System (EMS) for the CWS and HetNet Gateway (Parallel Wireless HNG) components, and provides a web-based Graphical User Interface (GUI) for operators to manage and monitor the network elements.

In some embodiments, a Parallel Wireless CWS may be used to provide 3G Radio Access, providing WCDMA air interface network interfaces for the CWS towards 3G core.

When using the CWS, or another small cell or femto node, it is possible in some embodiments to use the Iuh or Iur protocol to effectively provide 3G configuration and control for those nodes. When providing configuration and control for traditional 3G macro cells, the commonly-used Iub interface is supported by the Parallel Wireless HNG as well, and the Parallel Wireless HNG acts as the RNC for such a base station. In some embodiments, Iub and Iuh may be enabled at the same gateway. In some embodiments, a lower-level radio L1/L2 layer may be implemented in a hardware or software module on the Parallel Wireless CWS, or a software state machine for handling L1/L2 messages at the Parallel Wireless HNG.

Features of IuGW

In some embodiments, Parallel Wireless HNG may act as or provide an IuGw functionality. It mayalso encompass 3G SON and security gateway. In some embodiments, CWSes are virtualized by which HNB endpoint (towards external HNBGW) would be configured. There could be multiple CWSes virtualized per HNB endpoint or it could be a single CWS (macro hand over). In some embodiments, Parallel Wireless HNG may register large number of UEs (could be in thousands) from one HNB endpoint. HNBGW will be capable of supporting large number of UEs behind one HNB node. In some embodiments, a SON module may provide the functionality to provision CWS with information like Cell-ID, PSC and other OA&M details. SON may provide API to validate CWS attributes at the time of HNB registration. SON features may be enabled in some embodiments, such as: MRO—Iurh based, Outage Detection & Compensation, Coverage and Capacity Optimization, Energy Savings, Modification of Antenna Tilts, ICIC. In some embodiments, mobility optimization (a SON feature) may be enabled. In such an embodiment, Parallel Wireless HNG will be acting as Iur & Iurh proxy concentrating handovers. In such configuration handovers will be performed directly from the MACRO RNC to Parallel Wireless HNG bypassing 3G core network. In some embodiments, IuGw may expose individual CWS to HNBGW. So in a deployment scenario, there will be a set of CWSes which are emulated one-to-one with external HNBGW and there will a set of CWSes which as a group is emulated as one HNB with external HNBGW. The CWSes may be grouped in various ways. In some embodiments Parallel Wireless HNG based HNBGW uses CWS grouping to virtualize resources and allow flexible and auto assignment of LAC/SAC etc. In some embodiments Parallel Wireless HNG based HNBGW uses CWS grouping for RTP localization for a set of CWSs.

In some embodiments, this IuGW provided by the HetNet Gateway may be more than a simple router or proxy. Instead, the IuGW may handle Iub for communicating with 3G macro base stations, Iuh for commnuicating with Home NodeBs, or both in the same gateway, typically as separate software modules or sharing a state machine for tracking the behavior of the UE. In some embodiments this is done by providing a virtual RNC functionality at the base station. The virtual RNC functionality may be a complete software-virtualized RNC, in some embodiments, but may be a software state machine-driven proxy, in other embodiments, tracking the state of the remote nodeB as well as any attached UEs. The virtual RNC may communicate with other RNCs, virtual or non-virtual, or HNBGWs via Iur, and may communicate to HNBs using Iurh as well. The virtual RNC may terminate any tunnels needed to provide service to the UE. For example, the VRNC may act as a endpoint for a GTP-U tunnel carrying user data to a SGSN in the core network.

In some embodiments, the IuGw may run as part of Parallel Wireless HNG (LTE Access Controller, the Parallel Wireless controller node); may use the Parallel Wireless HNG build environment and scripts; Binaries may get packaged as part of unicloud rpm; may run as part of 'pwbootd' service; may use UniTask framework for process management; may use Parallel Wireless HNG confd CLI for configuration and statistics management; may use Parallel Wireless HNG alarm framework for alarm generation; and may use Parallel Wireless HNG logging framework for logging and for managing logging level. In some embodiments, Load distribution for control plane traffic may be implemented. Control plane traffic concentration towards external 3G core may be implemented. IuGw may forward user plane packets as UDP proxy using kernel module or dpdk. The IuGw proxy may be extended to full-fledged HNBGW running in Parallel Wireless HNG. But it is not expected to run HNBGW and Iuhproxy on the same Parallel Wireless HNG at the same time.

In some embodiments, deployment model here means that, criteria used for grouping multiple CWS-HNB's as single HNB, how many such grouping would be made and how are the cell-ids allocated to CWS and how they are mapped on the interface to HNBGW, etc. Group configuration may be used to associate one or more CWS and one HNB in it. When a message enters the Parallel Wireless HNG, group name for that message will be identified and tagged with the message. This group name is used by all process to identify required configurations and ingress/egress SCTP connections, etc. Parallel Wireless HNG need not interface with external HNB Management System (HMS), in some embodiments.

In some embodiments, an OAM may be included that contains: EMS communicating with Parallel Wireless HNG using NetConf Interface and presenting CWS & Parallel Wireless HNG Data Models; HMS Server; a Parallel Wireless HNG translation function providing interworking between the ConfD and Iuh provisioning; and SON features.

In some embodiments 3G Radio Access CWS, providing WCDMA air interface and Iuh interface towards HNB GW; Parallel Wireless HNG functionality, first phase deployment Parallel Wireless HNG will be playing multiple functions: IuGw; 3G SoN; SeGW—Security requirements contain both requirements for the IPsec, securing communication between the CWS node and the Parallel Wireless HNG where Parallel Wireless HNG is acting as SeGW, CWS WCDMA over the air security; and L2 WiFi Mesh security; OAM, that contains: EMS communicating with Parallel Wireless HNG using NetConf Interface and presenting CWS & Parallel Wireless HNG Data Models; HMS Server providing TR-069 support; Parallel Wireless HNG translation function providing interworking between the ConfD and Iuh provisioning; SoN features (such as MRO (Inter WCDMA only and statistics based), ANR, and PCI Planning & Optimization).

Supported in some embodiments: circuit-switched fallback (CSFB) from third party 4G Macro; CSFB from 4G CWS; Intra Frequency Handovers CN anchored; Inter Frequency Handovers CN anchored; Inter RAT Handovers Parallel Wireless HNG anchored; Intra Frequency Handovers Parallel Wireless HNG anchored; Inter Frequency Handovers Parallel Wireless HNG anchored; Inter RAT Handovers Parallel Wireless HNG anchored. Also supported in some embodiments is maintaining the continuity of UE support during RNSAP Relocation by transferring the information from the Source HNB to the Target HNB according to the section 5.10 of 3GPP TS 25.467 V11.1.0.

RANAP signaling is used to establish the Radio access bearers (RABs) in some embodiments. RAB-Assignment Request of RANAP carries all the details of the RABs. This message is usually carried inside the RUA Direct-Transfer message (except in the case of relocation).

Additional features in some embodiments include: Aggregation of the IPsec connections from the CWSs towards 3G Core; Aggregation of SCTP Connections from the CWSs towards 3G Core; Virtualization of the 3G Network; Radio resource management as RNC; Paging and handover optimization for smallcells managed by IuGW; Enable localized services, differentiated QoE for a group of NodeBs such as RTP localization.

Registration

At service start up Parallel Wireless HNG registers all the configured HNBs with external HNBGW. When CWS does a HNB registration it is locally processed and accepted by Parallel Wireless HNG. When the UE registers from CWS, it forwards the UE registration towards HNBGW after replacing required IEs. When service starts up, HGWCon performs HNB registration for configured HNBs with external HNBGW. When CWS does a HNB registration HNBCon processes and accepts the registration. When a UE register message is received at HNBCon, it selects a UEMgr and forwards it to that instance. HNBCon will tag this message with the group based on configuration and forward to UEMgr. At UEMgr a new entry for this UE is created and forwards it to HGWCon. At HGWCon it identifies the HNB for the group name and forwards the UE registration.

Mobility

Mobility between two different CWS Groups. When a UE moves between two different CWS groups external HNBGW needs to be informed. When Parallel Wireless HNG receives the 'Relocation Request' it maps the CWS ID and Cell ID to the corresponding HNB-ID and Cell ID for external HNBGW interface and forwards it to HNBGW. When it receives response it maps it back to the CWS interface IDs and forwards it to CWS. For all the mobility control plane messages Parallel Wireless HNG does the similar mapping and forwards it accordingly.

Internally for the mobility scenario, UEMgr maintains the mobility FSM states. When HGWCon forwards the message to external HNBGW it replaces the cell-id with correct cell-id as required for HNBGW interface. Similar call flow will apply for mobility with macro zone. Mobility between two CWS of same group—Node Level Call Flow. When a UE moves between CWS of same groups, no need to inform external HNBGW about the movement. Parallel Wireless HNG locally anchors the mobility.

Topology Hiding and Grouping

In some embodiments, the use of a virtualizing gateway may solve the problem of an increased number of small cells, to provide more capacity, more users, more handovers, and more load on the core. The Parallel Wireless HNG virtualizes small cells A, B, C, D to appear only as small cell A. Suppose RF planning isolates cells B, C, D from macro. Macro hands over to and from cell A. Cells B, C, D hand over to A and to each other. All handovers to and from B, C, D are advantageously hidden from the core. In such embodiments, the topology of the network may be hidden to improve handover performance. For example, a macro base station that can cover a large area may be preferable to a scattered set of small cell base stations when traveling at high speed on a highway, but the small cell coverage area may be preferable when moving at walking speed. Hiding certain small cells can result in avoiding unneeded and undesirable handovers.

In some embodiments, grouping of a set of nodes is performed. A proxy can be used to enable small cells to connect to a core network. However, a problem with a simple proxy is that some mobility scenarios require individual CWSes (small cells) to be exposed to the core. The examples of such scenarios are as shown herein. Specifically, when a two-stage handover is made available as shown herein with some cells constituting a "rural zone" and some cells constituting a "macro zone," it is difficult to proxy all individual cells as a single cell, because some of the "rural" cells are not adjacent to the macro and cannot be proxied toward the core as if they were a single cell adjacent to the macro.

The solution to this problem is to provide flexible grouping of cells toward the core. Some CWSes are emulated 1:1 with the HNBGW. Others are emulated as a virtualized group. This mapping may be configured statically or dynamically, such as being allocated from a pool. Each CWS has a unique CGI. Each CWS can be assigned its own location area code (LAC), service area code (SAC), and routing area code (RAC), as defined in, e.g., 3GPP TS 23.003, V9.15.0 hereby incorporated by reference, which are identifying parameters for small cells; however, based on what is needed, some of these parameters may be shared among CWSes, and multiple CWS can share one or more of these identifiers via a common profile. In some embodiments, multiple vRNCs and RNC IDs may be supported. Allocation of groupings to cells may be performed at a control node, such as at the Parallel Wireless HNG or HetNet Gateway. The cells may receive their configuration using X2, NETCONF, or any other control channel. The cells need only be made aware of their own grouping. The advantages of this are that certain local actions are thereby enabled by the local nodes, such as base station/HNB and UE Registration and mobility between two different small cell groups, as described herein. In some embodiments, the location of each small cell base station (CWS) may be tracked. Each CWS's CGI may be mapped to lat/long. Location information can be provided for CWS as CWS has GPS. The Parallel Wireless HNG acts as downstream system using CGI to cross-refer to originating cell. 3GPP location based services (LBS) support for emergency calls may be provided. In some embodiments, geographic location may be used to create groups, which may then be used to perform targeting of ads, disaster warnings, text messages to all subscribers, etc. In some embodiments, MBMS functions may be performed on individual groups to provide, e.g., localized broadcast. In some embodiments, backhaul may be managed and optimized on a per-group level. Other optimizations may be performed within groups or subgroups.

To support topology hiding feature, Parallel Wireless HNG may hide the CWS IP addressing/ports towards the 3G core and vice versa. This means that the RAB Assignment Request coming in from 3G core will be terminated at Parallel Wireless HNG. Parallel Wireless HNG will store the parameters of the RAB including the transport layer information provided by 3G core. Parallel Wireless HNG will then originate new request towards the CWS such that it contains transport layer information specific to Parallel Wireless HNG. When the CWS replies with RAB Assignment Response message, Parallel Wireless HNG will again store the parameters provided by CWS and send a response to the HNBGW that may include Parallel Wireless HNG assigned transport network layer parameters. When the data starts flowing through the Parallel Wireless HNG, it will appropriately proxy the data from one side to the other side based on the control information of how transport network parameters were assigned for a given bearer.

Each set of CWS that is represented as one virtualized HNB (aka operator-network) will be configured with its own ingress user-plane IP address and egress user-plane IP address. User plane IP address can be same as control plane IP address because user plane is over UDP while control plane uses SCTP. However, typically it needs to be ensured that this same IP is not used elsewhere in the system (e.g. SON/Configmg link etc) where it can now or in future cause conflicts due to UDP port range clash. Note that ingress and egress user-plane IP addresses need to be different. In Phase-1, Parallel Wireless HNG will allow configuration of only one user plane IP address at ingress and one at egress. In future, we may allow multiple user-plane IP addresses. For each bearer within an operator-network, Parallel Wireless HNG will allocate one pair of UDP ports. This will be communicated to both the CWS as well as to the 3G core in RAB Assignment Request/Response messages. When the peers send data packets to Parallel Wireless HNG for the given bearer, they will be destined to this UDP port and the IP address of user-plane ingress or egress. Based on the IP address, Parallel Wireless HNG will be able to find out the direction and based on the UDP port number, it will be able to find out the bearer. Mapping information will be available which it will then use to proxy the packet out with appropriate parameters. While allocating UDP port number blocks, Parallel Wireless HNG would leave out the initial system port range. E.g. The port allocation will start after 1024. The first bearer to get created can get the port number 1026 (first even port after 1024). If PS user-plane is also running on the same IP address then GTP is going to use UDP port 2152. So that port may be left out.

Control Plane and User Plane

Parallel Wireless HNG acts as vRNC/HNBGW. While acting as vRNC it interfaces with outdoor NodeBs (pico, micro, metro) over Iuh interface. It does radio resource management as a typical RNC because it has visibility of all the radio nodes and their resources. It presents standard based interfaces towards MSC and packet core such as Iu-CS and Iu-PS. The HNBGW serves the purpose of a RNC presenting itself to the CN as a concentrator of HNB connections. The interface between CN and the HNBGW serves the same purpose as the interface between the CN (Core Network) and a RNC. Parallel Wireless HNG also performs 3G SON functions for PSC allocation and ANR table management. It also provides plug and play function for 3G node as well as dynamic RF power adjustment.

HNBGW segregates Control Plane & User Plane traffic for performance enhancement. User plane is further divided into CS and PS user plane traffic.

User plane. In some embodiments, regarding circuit switched (CS) call setup and data transfer, HNBGW CS user plane is responsible for relaying RTP packets in uplink and downlink directions. In some embodiments, vRNC/HNBGW supports the transport of signaling and data messages over IU and Iuh interfaces for successful CS call establishment and data transfer. Mentioned below are the messages supported: Iuh signaling messages using HNBAP over SCTP: HNB REGISTER REQUEST/ACCEPT/REJECT; HNB DEREGISTRATION; UE REGISTRATION/ACCEPT/REJECT; UE DEREGISTRATION; ERROR INDICATION. Iuh signaling messages using RUA over SCTP CONNECT; DIRECT TRANSFER; CONNECTIONLESS TRANSFER; DISCONNECT; ERROR INDICATION. NAS signaling transfer via RANAP message: INITIAL UE MESSAGE; DIRECT TRANSFER; IU RELEASE REQUEST/COMMAND/COMPLETE; RAB ASSIGNMENT REQUEST/RESPONSE; RAB RELEASE REQUEST; RAB MODIFICATION REQUEST; RELOCATION REQUIRED/COMMAND/FAILURE; RELOCATION REQUEST/REQUEST ACK/FAILURE; RELOCATION COMPLETE; RELOCATION DETECT; RELOCATION CANCEL/ACK; PAGING; COMMON ID; RESET/RESET ACK; RESET RESOURCE/RESOURCE ACK; ERROR INDICATION; SECURITY MODE CONTROL. In some embodiments, regarding packet switched (PS) call setup and data transfer, The signaling messages mentioned with respect to CS would also be supported for PS domain. For data transfer during PS call, HNBGW user plane for PS domain is responsible for relaying GTP packets in uplink and downlink directions.

For the user plane, in some embodiments, Parallel Wireless HNG as IuGW will support both circuit-switched (CS) data proxy and packet-switched (CS) data proxy modes.

For the CS User Plane, in some embodiments, voice or video stream data will be encoded inside RTP protocol. RTP will be carried over UDP over IP transport. RTCP may be used but is optional. The receiving entity may ignore incoming RTCP PDUs. RTCP is again carried over UDP over IP transport. Each transport bearer is identified by the UDP port number and the IP address (source UDP port, destination UDP port, source IP address and destination IP address). Parallel Wireless HNG will need to reserve two consecutive ports per transport bearer (one for RTP and another for RTCP). Pair of two ports is referred as port number block. For RTP protocol, an even numbered UDP port is used. RTCP uses the consecutive odd numbered port.

Transport layer information for CS plane in RANAP protocol includes 'transport layer address' and 'Iu Transport association'. Transport layer address contains IP address encoded in NSAP (Network-service-access-point) structure as per RFC 4548. Iu-Transport-Association will contain the UDP port inside the Binding-ID field. This UDP port will be an even numbered port to be used by RTP protocol.

Voice/video packets are usually very short (approximately less than 100 bytes). For every bearer of every user, sending the small packets increases the overall link bandwidth requirement because of overhead (UDP/IP) of transferring each packet. Also for the receiving end, packet rate will become a parameter for its overall capacity. To solve this, 3GPP has proposed multiplexing scheme where the 3G core advertises only one UDP port (called RTP mux port) to the HNB. HNB then collates multiple RTP packets (could be of different users) and forms a bigger packet (which contain smaller RTP chunks and additional multiplexing headers). HNBGW receives this bigger packet and it then de-multiplexes the RTP chunks for processing. Multiplexing is defined only in uplink direction. Secondly, it is optional. If the HNB does not support multiplexing, it can still keep sending the uplink RTP streams as per the RAB assignment ports and ignore the RTP mux port. In the first phase, Parallel Wireless HNG behaving as virtual HNB will ignore the RTP multiplexing if any offered by the 3G core.

HNBGW may support the transfer of short message services (SMS) between UEs, in some embodiments, including: SMS-MT: message sent by the UE; SMS-MO:message sent to the UE.

Control Plane. In some embodiments, the control plan acts as follows. The control plane handles signaling messages and manages the TNL address translation, RTP Port/GTP-U TED management (Tunnel Endpoint Identifier) and sends the TNL address translation updates to user plane application over the propriety interface. The circuit-switched user plane handles the TNL address translation updates, create/delete/modify RTP session in both HNB and CN direction, processes and forwards RTP data packets towards HNB/CN. The packet-switched user plane handles the TNL address translation updates, create/delete/modify GTP-U tunnel in both HNB/NB and CN direction, processes and forwards GTP-U data packets.

HNBGW supports hand-out and hand-in of on-going calls to/from neighboring cells, in some embodiments, including CS Handover (relocation of context to/from neighboring cells for on-going voice conversations) and PS Handover (relocation of context to/from neighboring cells to on-going data sessions). When UE moves between CWSes of same group, location reporting and path switching may be implemented.

HNBGW provides access control for HNBs/UEs based on white list configuration, in some embodiments. White list shall contain IMSI and HNB ID information. When the white list configuration is enabled, only those HNBs/UEs included in the list are allowed to access HNBGW resources. On the other hand, when disabled, any HNB/UE is allowed to access the HNBGW.

FIG. 5 is a schematic network architecture showing security and signaling characteristics in accordance with some embodiments.

Figure 6:
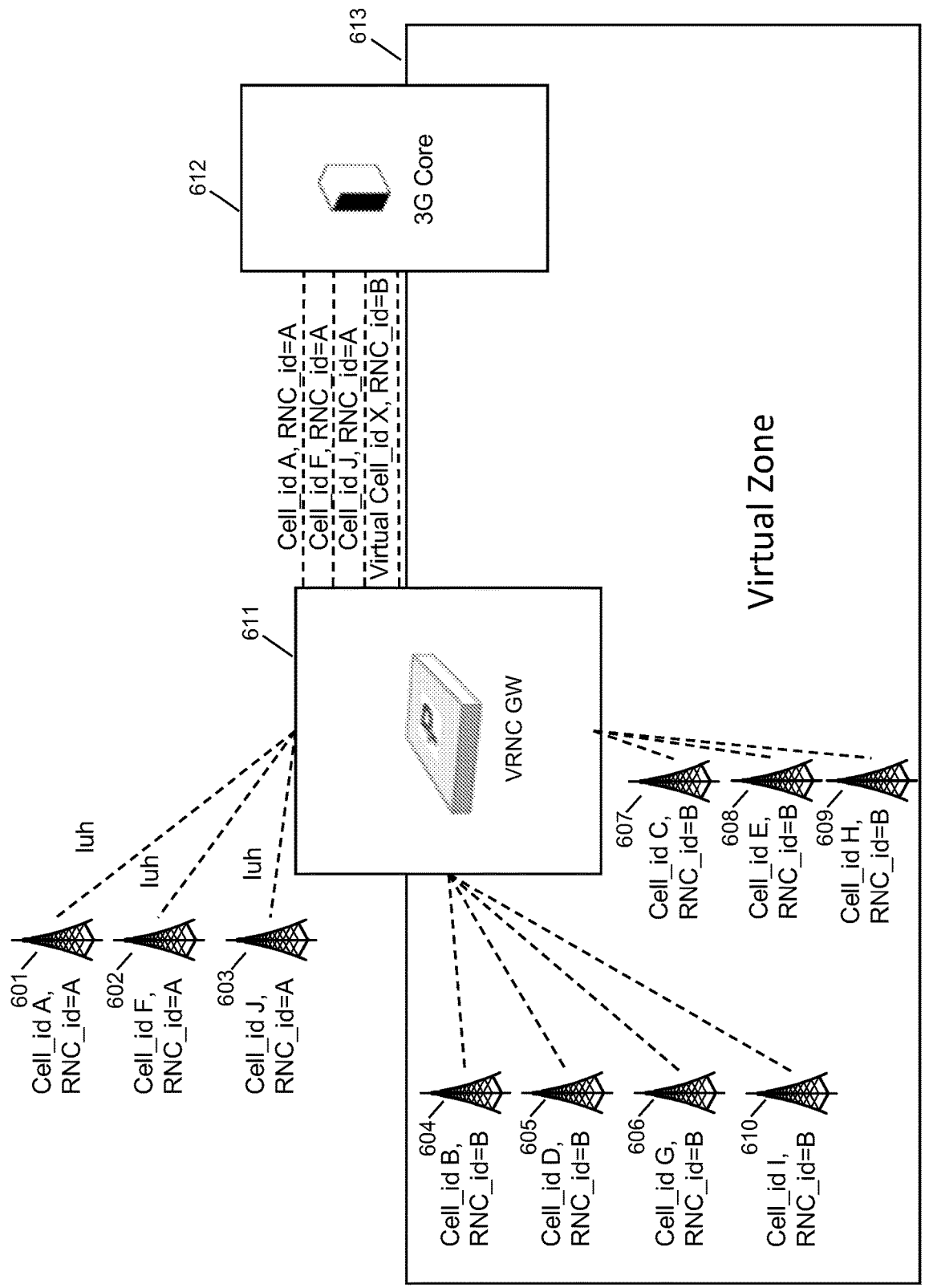
FIG. 6 is a schematic network architecture showing base station grouping in accordance with some embodiments.

FIG. 6 is a schematic network architecture showing base station grouping in accordance with some embodiments. VRNCGW 611 sits in the network between the RAN and the core network, which here is a 3G core 612. Several base stations, 601, 602, 603, 604, 605, 606, 607, 608, 609, 610 are shown. Base stations 601, 602, 603 are handled separately from base stations 604, 605, 606, 607, 608, 609, 610. This is because base stations 604, 605, 606, 607, 608, 609, 610 are in a "virtual zone" 613, which has been designated as not permitted to perform handins from a macro cell. In a rural small cell deployment, this is to ensure that mobile devices are not handed in when the result of a handin will be an immediate handout, or worse, a call drop due either to a small coverage area or a coverage area that is not conducive to handing over to another cell. The grouping method described with respect to this embodiment is applicable to both 3G and 4G (LTE), although the base stations shown in FIG. 6 are 3G nodeBs. As shown in the interfaces between VRNCGW 611 and 3G core 612, the VRNCGW communicates individually to each base station (here, using Iuh), but does not permit the core to address each of the virtual zone base stations independently. Rather, all of the virtual zone base stations are treated as a single virtual cell with a special ID. As well, the virtual zone base stations are given a separate RNC ID as well, in some embodiments. In order for a handset or mobile device to be handed over from a macro to one of the base stations managed by the VRNC, the handset must be handed over first to one of the regular base stations 601, 602, 603, and from there it can be handed over to to any cell in the virtual zone. This is shown visually in the next figure and is referred to as two-stage mobility.

Figure 7:
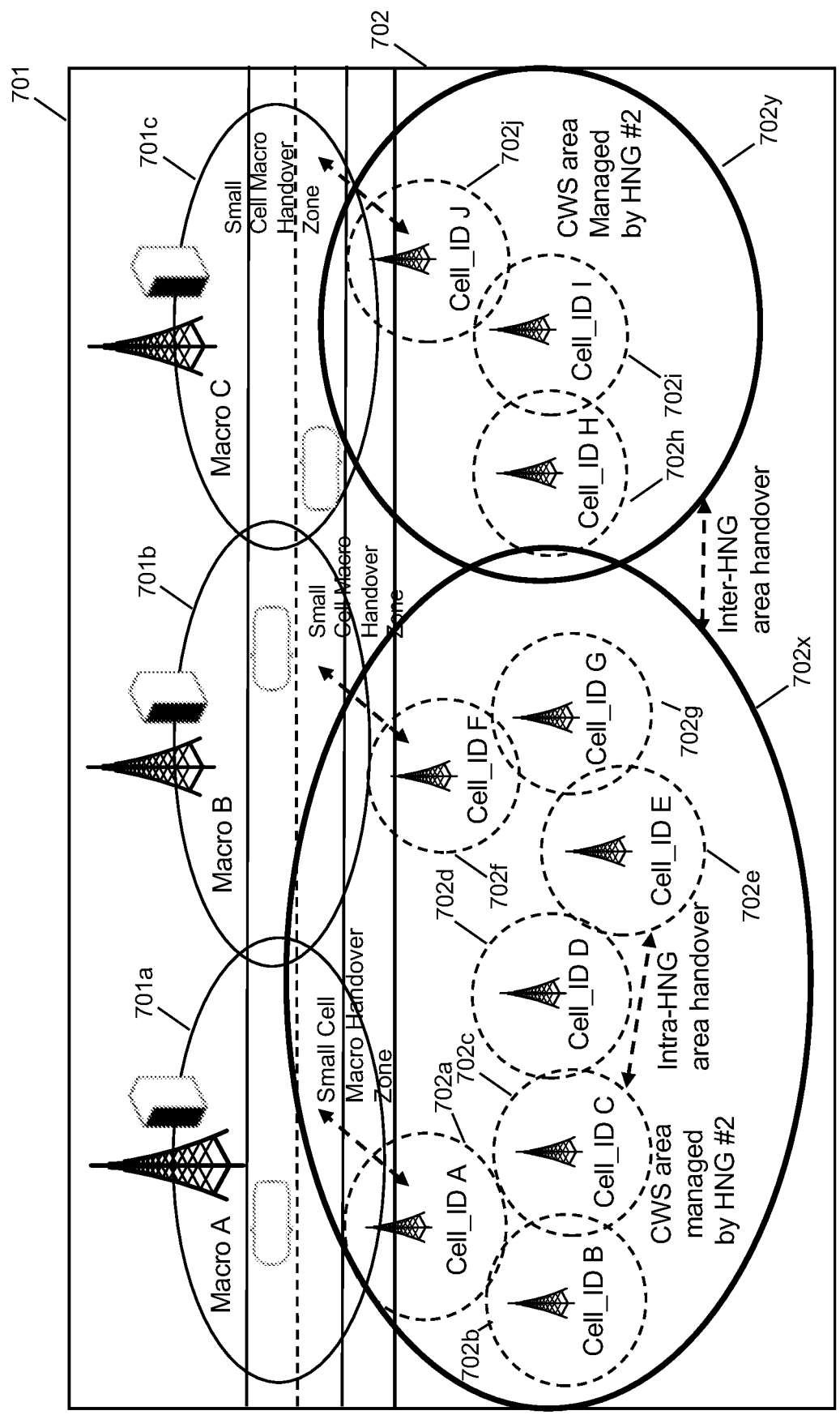
FIG. 7 is a schematic base station deployment topology diagram, in accordance with some embodiments.

FIG. 7 is a schematic base station deployment topology diagram, in accordance with some embodiments. Shown is a typical "Rural Deployment". In this type of deployment CWSs are used mainly for coverage augmentation (not for the data offload under the overlaying macro coverage). Current WCDMA release concentrates on "Rural" type of solution only. The cell IDs are different than shown in FIG. 6, but the figure reflects a similar type of deployment. The grouping method described with respect to this embodiment is applicable to both 3G and 4G (LTE), and either a 3G NodeB or a 4G eNodeB may be considered wherever a base station is shown in this figure. The method described is useful for deployment of small cells or for underlay of small cells under a macro coverage area.

Figure 10:
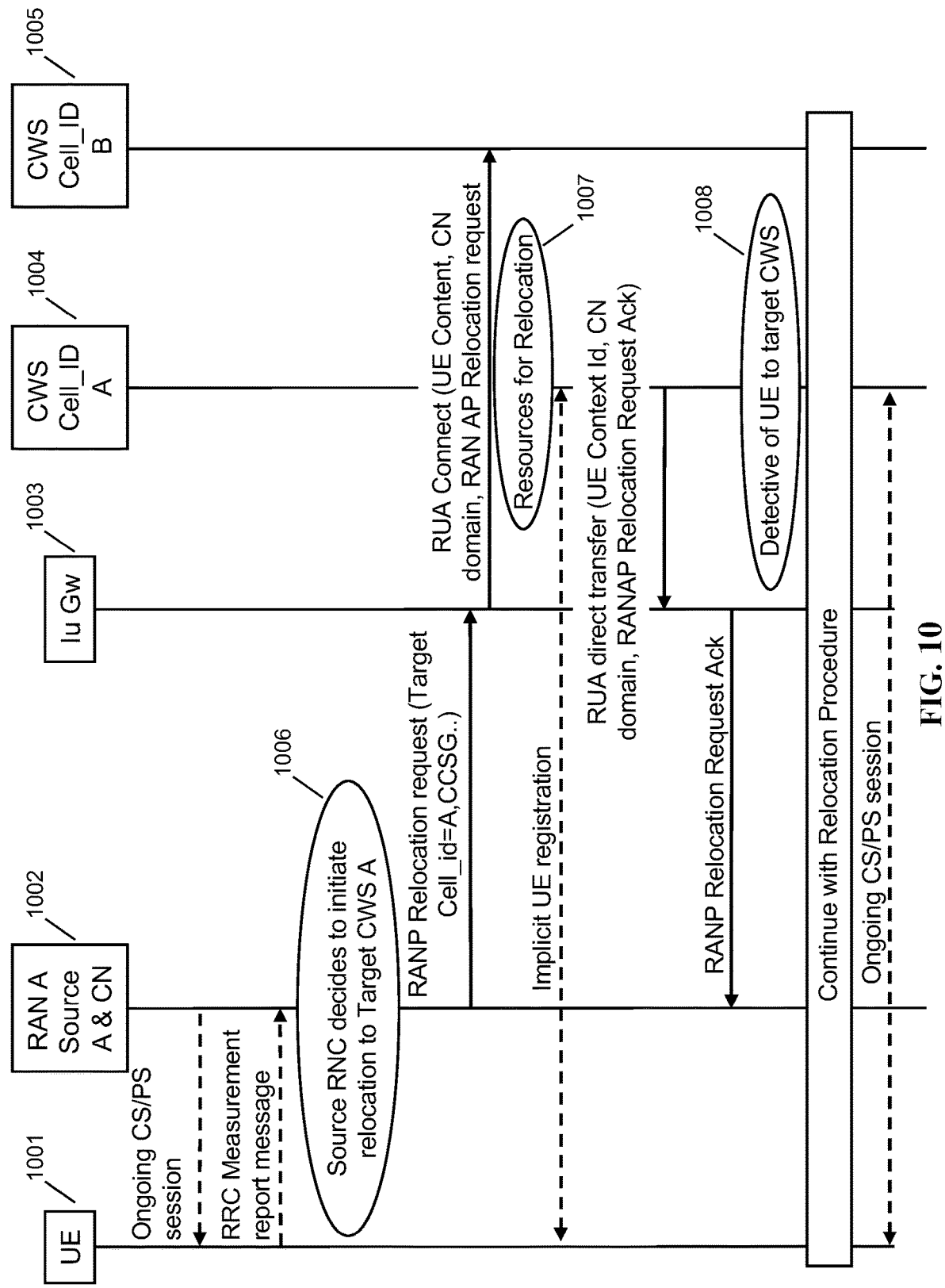
FIG. 10 is a signaling call flow showing a two-phase macro to rural zone mobility scenario, in accordance with some embodiments.

As shown in FIG. 7, not all Rural zone CWSs will have overlapping coverage with the Macro Zone, hence in order to support session continuity, two-phase mobility may be required as shown in this figure and also in FIG. 10. Hand-in from Macro to neighboring CWSes (for example hand-in between RAN A and CWS Cell_Id A. entering Rural zone) is a two-phase handover. HNG may be a VRNCGW or management gateway, and CWS may be a multi-RAT node, in some embodiments.

Macro zone 701 includes macro 701a, macro 701b, and macro 701c, each providing coverage over a large area of a highway. The macro zone is created as a group in the VRNCGW or management gateway.

Rural zone 702 includes base stations 702a, 702b, 702c, 702d, 702e, 702f, 702g in HNG management area 702x, and base stations 702h, 702i, 702j in HNG management area 702y.

Handovers among the base stations shown in FIG. 7 fall into the following categories: small cell to macro handovers, to or from Rural Zone to Macro Zone; inter-small cell handovers within an HNG management area; and intra-HNG management area handovers. Each HNG management area 702x, 702y may appear as a single macro base station to the core network, in some embodiments, such that handovers between 702x and 702y are handled like regular handovers, with the two HNGs transparently identifying which cell the UE is in using the cell ID. For intra-HNG area handovers, any notification of the handover may be suppressed toward the core network, as from the perspective of the core network a handover between two intra-HNG cells does not result in the UE moving from one eNB (or NB) to another eNB (or NB).

For handovers to and from the macro network, the handover zone for, e.g., macro 701a only impinges on cell 702a. So the HNG will not permit a handover from the macro A to cells B, C, D, E, F, or G. This is a function of the coverage area of the cells. Otherwise handovers are handled normally. Various other rules can be set up so that handovers are permitted under only desirable conditions.

Groupings may be performed in the VRNCGW across G's, in some embodiments. For example, the rural zone may include both 3G and 4G cells, and handovers between them and a set of 3G macros in a macro zone may be handled according to the described method. Multiple groups per HNG management area may be used in some embodiments. Groupings may be made based on RF conditions, topological or geographical conditions, trains or highways or other features of the landscape leading to assumptions about user speed, or neighbor relation tables that relate to the topology of the graph of the cells' coverage areas, or other factors.

Operation and Call Flows

Figure 8:
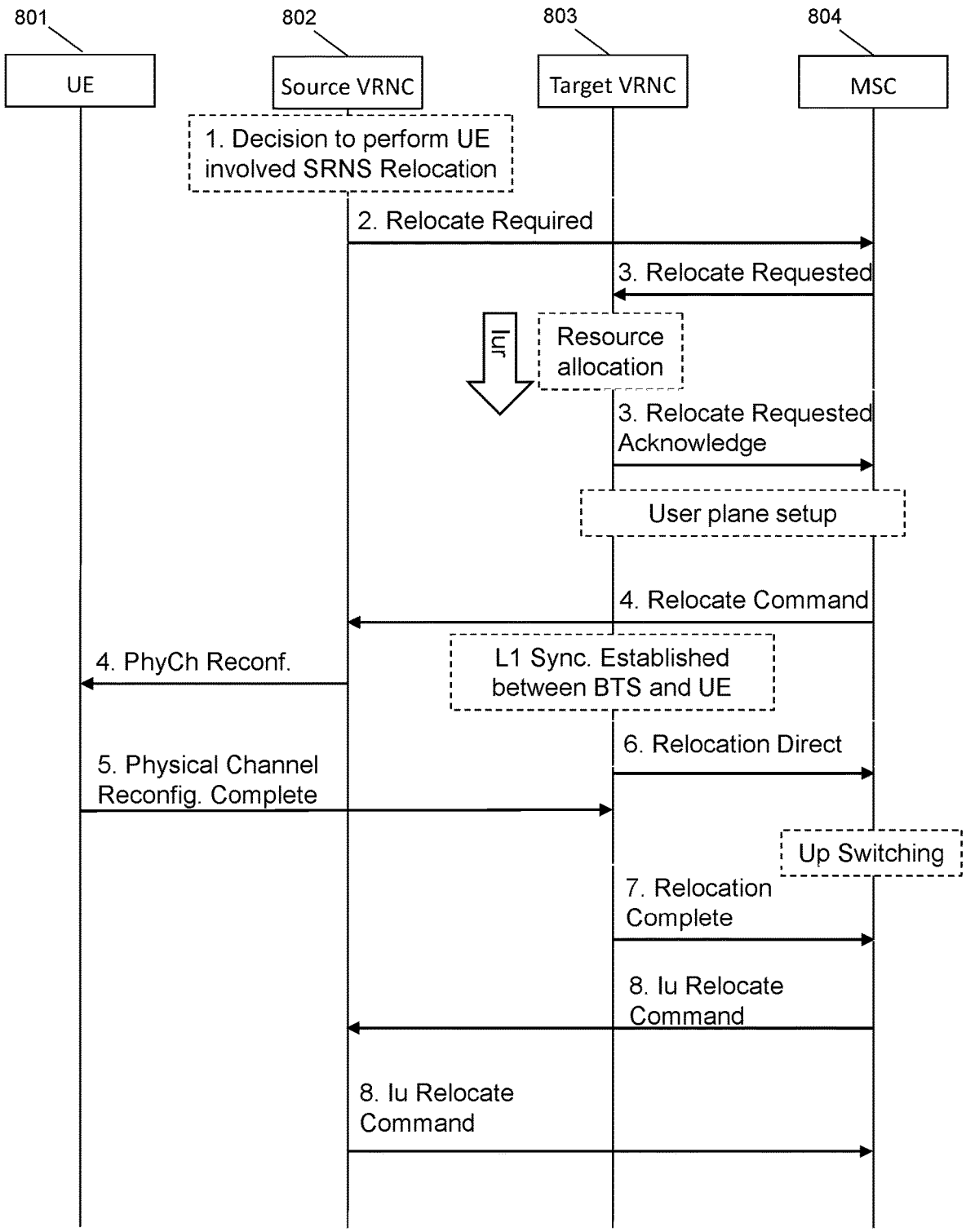
FIG. 8 is a signaling call flow showing a handover of a circuit-switched session at a gateway, in accordance with some embodiments.

FIG. 8 is a signaling call flow showing a handover of a circuit-switched session at a gateway, in accordance with some embodiments. UE 801 has moved from a first coverage area to a second coverage area, and attaches to a nodeB (not shown), which is controlled by source VRNC 802. Source VRNC 802 is a VRNCGW, as described herein, proxying and serving as a gateway for the nodeB to the 3G core network. The UE 801 requests to be handed over from its prior cell to this cell, and since this is a circuit-switched session, the relocation request is sent from the nodeB to the source VRNC 802 to the MSC 804 in the core network. The MSC 804 then sends a message to target VRNC 803, which is the VRNCGW handling the UE's prior cell. Handover proceeds in the same manner as described by the 3G standard; however, in some embodiments source VRNC 802 and target VRNC 803 are both VRNCGWs. In some embodiments source VRNC 802 may be handling a nodeB using the Iub interface, and target VRNC 803 may be handling a Home nodeB or a Parallel Wireless multi-RAT node using the Iuh interface, or vice versa. In some embodiments both base stations may be Iub or Iuh. In some embodiments, Iub and Iuh may be enabled by software or hardware modules at the same VRNCGW. In some embodiments, inter-RAT handovers or steering between 3G and 4G may be enabled by having 3G and 4G modules on the same VRNCGW.

Figure 9:
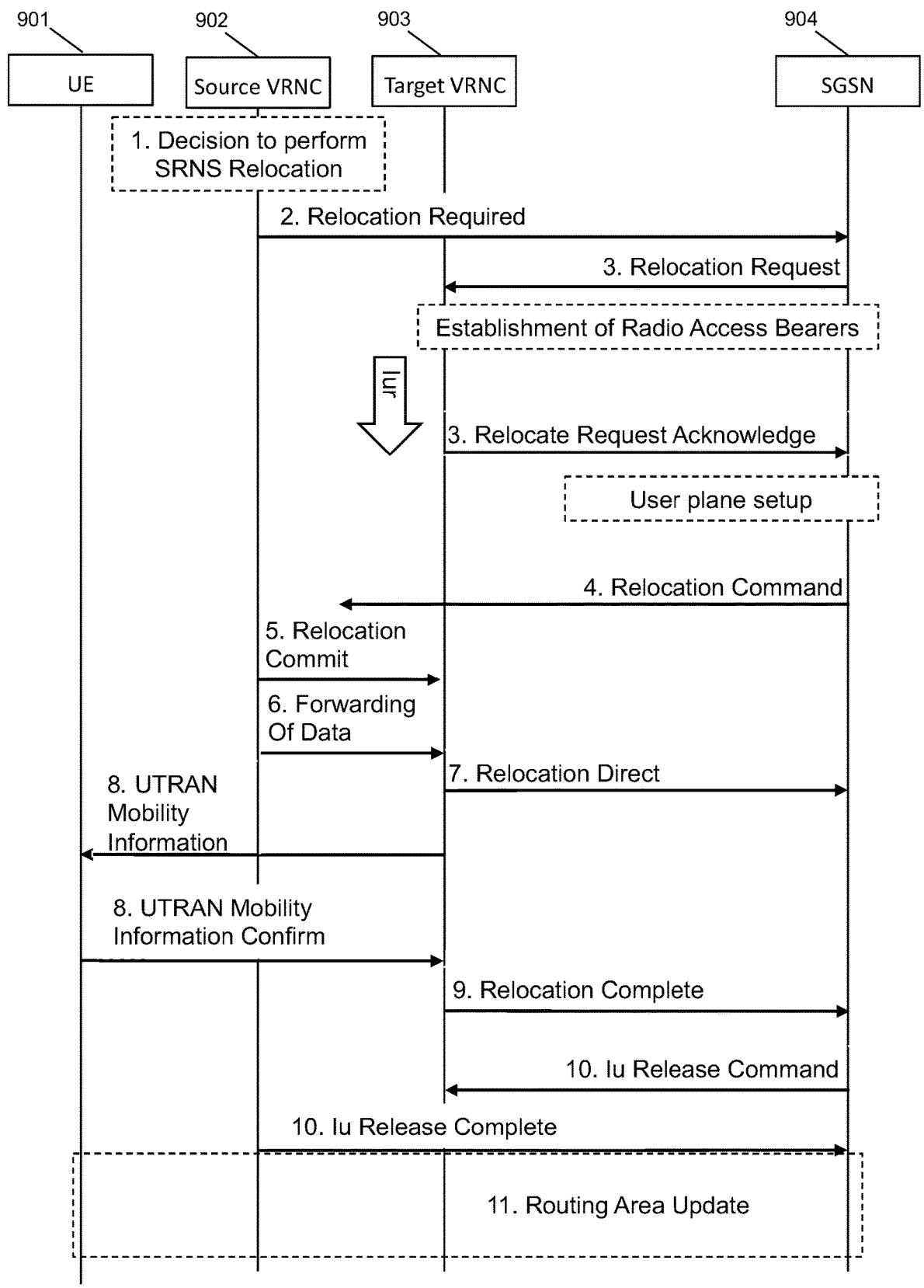
FIG. 9 is a signaling call flow showing a handover of a packet-switched session at a gateway, in accordance with some embodiments.

FIG. 9 is a signaling call flow showing a handover of a packet-switched session at a gateway, in accordance with some embodiments. UE 901 has moved from a first coverage area to a second coverage area, and attaches to a nodeB (not shown), which is controlled by source VRNC 902. Source VRNC 902 is a VRNCGW, as described herein, proxying and serving as a gateway for the nodeB to the 3G core network. The UE 901 requests to be handed over from its prior cell to this cell, and since this is a packet-switched session, the relocation request is sent from the nodeB to the source VRNC 902 to the SGSN 904 in the core network. The SGSN 904 then sends a message to target VRNC 903, which is the VRNCGW handling the UE's prior cell. Handover proceeds in the same manner as described by the 3G standard; however, in some embodiments source VRNC 902 and target VRNC 903 are both VRNCGWs. In some embodiments source VRNC 902 may be handling a nodeB using the Iub interface, and target VRNC 903 may be handling a Home nodeB or a Parallel Wireless multi-RAT node using the Iuh interface, or vice versa. In some embodiments both base stations may be Iub or Iuh. In some embodiments, Iub and Iuh may be enabled by software or hardware modules at the same VRNCGW. In some embodiments, inter-RAT handovers or steering between 3G and 4G may be enabled by having 3G and 4G modules on the same VRNCGW.

In some embodiments, the solution may support handins from Macro Zone according to section 5.9.4a of [1] (open access HNBs). For Connected Mode Inbound Mobility for CSG UEs to CSG HNBs or to Hybrid Cells: see section 5.9.2a of [1]; for Connected Mode Inbound Mobility for non-CSG UEs to CSG HNBs or to Hybrid Cells, see section 5.9.3a of [1] The handin solution implementation may be based on Parallel Wireless HNG supporting Macro-to-Femto (M2F) handin using the Fan-out approach for Relocation Request for pre-Rel-9 UEs (Macro-RNC can't identify target-Cell-id). For Enhanced Relocation from Open Access and Hybrid CWS (HNBs) to RNC—see section 5.11.2 of [1]; Enhanced Relocation from RNC to Open Access CWS (HNBs) see section 5.11.2.2 of [1]; Enhanced Relocation from RNC to Hybrid CWS (HNBs) see section 5.11.2.3 of [1].

FIG. 10 is a signaling call flow showing a two-phase macro to rural zone mobility scenario, in accordance with some embodiments. In this example, a handover is shown between the Macro Zone (RAN A) and the Rural Zone (CWS Cell_id A). The method described and shown in this figure relates to eNodeBs and LTE as well as to nodeBs and UMTS/3G, and also to any other "G" radio access technology.

UE 1001 is initially attached to macro nodeB A 1002, which is handled by an RNC in the core network (not shown). Also available are IuGW 1003 (a VRNCGW) and CWS base stations 1004 and 1005. CWS 1004 has cell ID A. CWS 1005 has cell ID B. Initially, UE 1001 is attached to macro 1002. However, upon performing measurement reports it becomes apparent that the signal of the macro is decreasing, and based on measurement reports, at step 1006 the source RNC (not shown) decides to initiate relocation to target CWS A 1004. Target CWS A 1004 is managed by IuGW 1003, that is, IuGW 1003 is acting as the RNC for this CWS. The source RNC (not shown) sends a RANP Relocation Request with the identified target cell's cell_id=A. As shown in step 1007, the CWS A allocates resources for the UE, and at step 1008, detects the presence of the UE in its coverage area. The rest of the handover proceeds normally per the 3G standard. The IuGW/VRNC acts as an RNC toward the source RNC, and also acts as an RNC toward CWS A 1004, to facilitate the handover.

Figure 11:
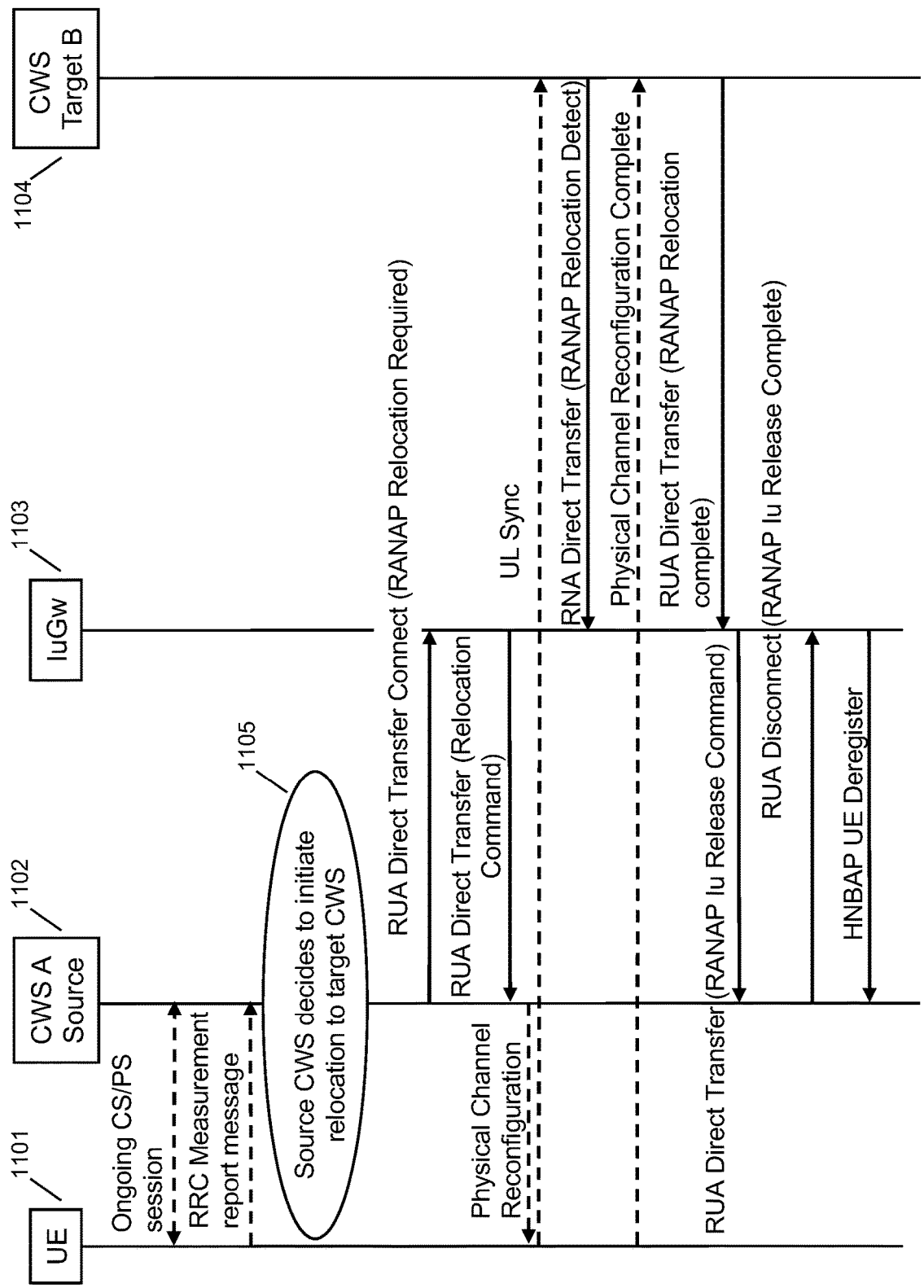
FIG. 11 is a signaling call flow showing an Iuh anchored rural to rural zone mobility scenario, in accordance with some embodiments.

FIG. 11 is a signaling call flow showing an Iuh anchored rural to rural zone mobility scenario, in accordance with some embodiments. FIG. 11 illustrates typical high level handover between the CWSs in the Rural Zone (for example from CWS Cell_id A to CWS Cell_id B). The method described and shown in this figure relates to eNodeBs and LTE as well as to nodeBs and UMTS/3G, and also to any other "G" radio access technology.

UE 1101 is initially attached to CWS A 1102, which is managed by IuGW 1103, which is a VRNCGW as described herein. Also available is CWS base station 1104, which is also managed by IuGW 1103. CWS 1102 has cell ID A. CWS 1104 has cell ID B. Initially, UE 1101 is attached to CWS 1102. However, upon performing measurement reports it becomes apparent that the signal of the macro is decreasing, and based on measurement reports, CWS 1102 decides to initiate relocation to target CWS B 1104, as shown at 1105. As according to the standard, the source CWS 1102 sends a RUA Direct Transfer Connect request to the IuGW 1103. The IuGW/VRNC does not need to contact the core network to facilitate the handover, but responds by simply replying with a RUA Direct Transfer relocation command to CWS 1102. Once the handover is completed, with a RANAP Relocation Complete message, the IuGW 1103 intercepts it and no message is sent to the core network. Further messages to the UE from the core network will be disambiguated and sent to CWS B. The HNBAP UE Deregister message from CWS 1102 is also intercepted and silenced, e.g., not sent to the core network.

Figure 12:
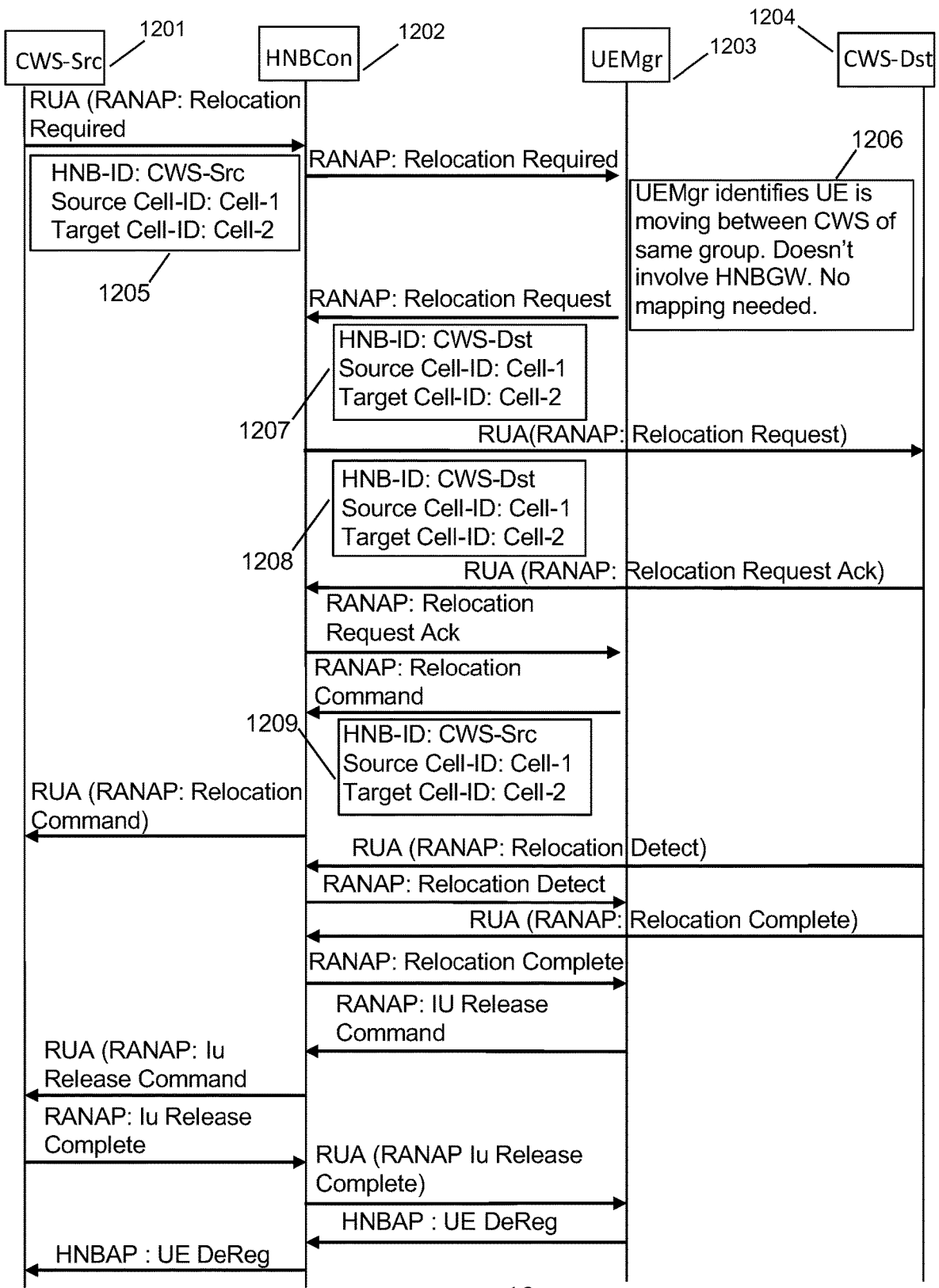
FIG. 12 is a signaling call flow showing additional aspects of a rural to rural zone mobility scenario, in accordance with some embodiments.

FIG. 12 is a signaling call flow showing additional aspects of a rural to rural zone mobility scenario, in accordance with some embodiments. Mobility between two CWS of same group—Internal Message Flow. Since the UE moves between CWS of same group, UEMgr doesn't map the CWS and Cell IDs. It maintains the mobility FSM states, but instead of involving external HNBGW it locally anchors the mobility. The FSM states for UE mobility between CWS of same group and different group will be different and it would need two set of FSM transitions.

CWS-Src 1201, which is a base station, is controlled by an HNG, represented by internal modules HNBCon 1202 and UEMgr 1203. At step 1205, a handover is requested to CWS-Dst 1204. At step 1206, the UEmgr is aware of the state and determines that no mapping is needed with the HNBGW because the two CWSes are in the same group. At step 1207, UEmgr 1203 replies with the relevant information for a RANAP relocation request, which is passed along by HnbCon 1208, and an additional RANAP relocation command is sent at step 1209. Relocation is completed without signaling to the core network.

Figure 13:
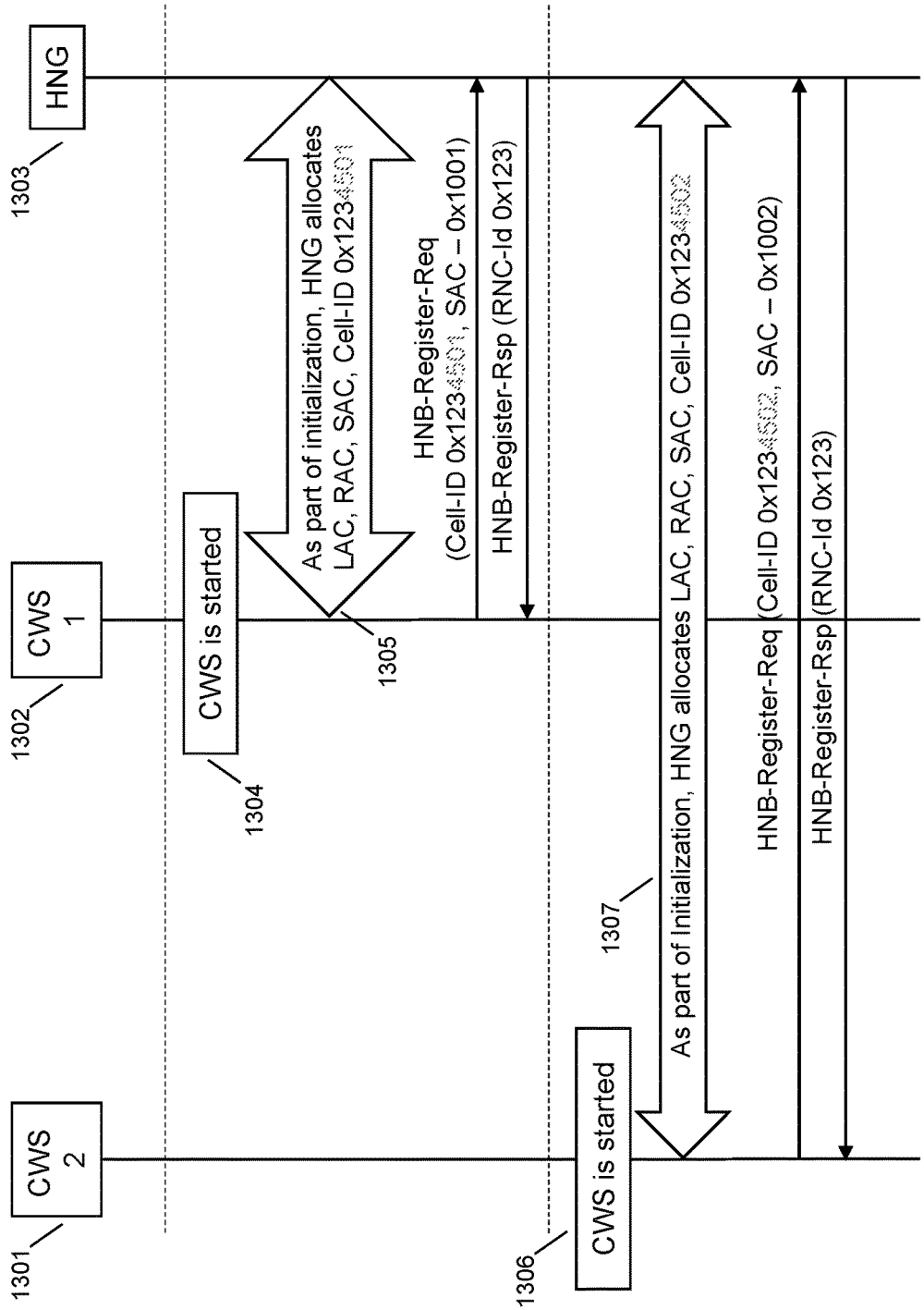
FIG. 13 is a signaling call flow showing base station registration, in accordance with some embodiments.

FIG. 13 is a signaling call flow showing base station registration, in accordance with some embodiments. CWS-2 1301 and CWS-1 1302 are connected to HNG 1303, which is a VRNCGW as described herein. CWS-1 is started first, step 1304, and as part of initialization requests identifiers, e.g., LAC, RAC, SAC, and cell ID from the HNG, step 1305. It receives CellId 0x1234501. Next, CWS-2 is started, at step 1306. When it initializes and requests identifiers, at step 1307, it receives a different cell ID, CellId 0x1234502, which is used thereafter to distinguish the cell at the HNG.

Figure 14:
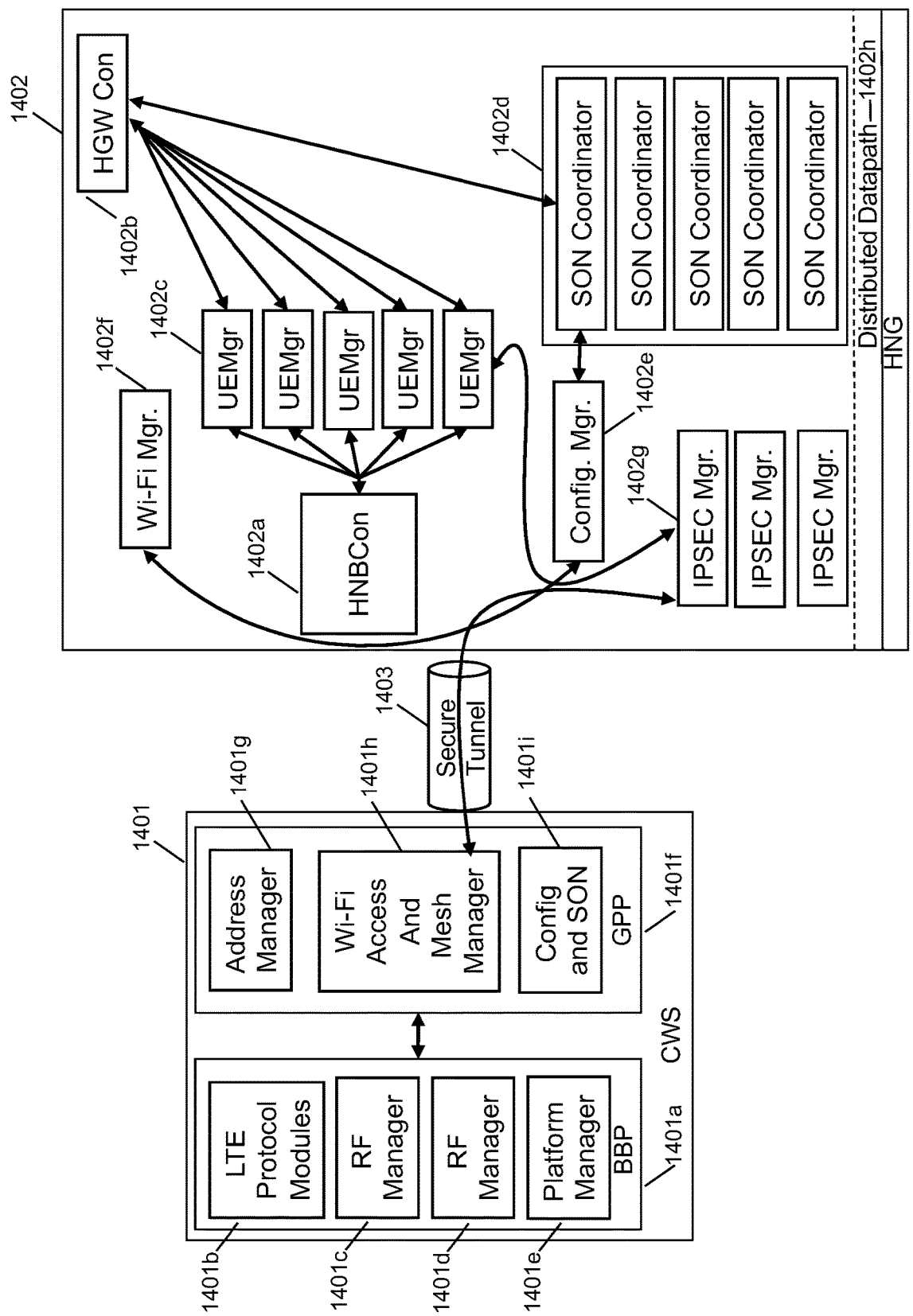
FIG. 14 is a schematic architecture diagram of an exemplary base station together with an exemplary gateway, in accordance with some embodiments.

FIG. 14 is a schematic architecture diagram of an exemplary base station together with an exemplary gateway, in accordance with some embodiments. Exemplary CWS base station 1401 includes LTE protocol modules 1401*b*, RF manager 1401*c*, OAM manager 1401*d*, and platform manager 1401*e*, each of which is managed as part of a baseband processing (BBP) module 1401*a*. Additionally, address manager 1401*g*, Wi-Fi access and mesh manager 1401*h*, and Config/SON module 1401*i* are part of a general purpose processing (GPP) module 1401*f*. A single IPsec secure tunnel 1403, in some embodiments, connects the CWS to the HNG 1402. HNG 1402 includes a Home NodeB manager 1402*a*, core network module/HGWcon 1402*b*, UE managers 1402*c*, SON coordinators 1402*d*, config manager 1402*e*, Wi-Fi manager 1402*f*, and IPsec managers 1402*g*. The modules are all stateful and share data with each other. Multiple instances of each module are present, each with a connection to a distributed control path 1402*h*.

The gateway has the following characteristics: distributed control plane across multiple cores; distributed data path across multiple cores; no single point of failure for control and data processing; throttling to limit traffic on a core; IP access control lists (ACLs) (static or dynamic or both); dynamic ACLs using an algorithm to detect a source IP sending invalid ISAKMP_INIT.

HNBCon and HGWCon interacts directly without UEMgr for non UE related messages like Reset, Paging, etc. When UE is handed off, mobility FSM states are maintained by UEMgr. HGWCon would have less intelligence about the CWS locations and mapping. It maintains the states of HNB connection towards HNBGW and in a crude sense acts as a pipe towards external HNBGW. This process may be replaced with a full-fledged HGW process in some embodiments. HNBCon will maintain HNB FSM states, UEMgr will maintain HNB-UE FSM, IU FSM, RAB FSM states and HGWCon will maintain HNB FSM for HNBGW interface. Neighbor table will be maintained by SON and it will be used for allocating cell id related information.

RUA Connect Forking

In some embodiments, a PCI conflict may occur when two CWSes have the same cell ID, in this case shown as Cell_id A. The IuGw may gracefully handle the conflict by forking the RUA connect request. This results in both CWS A's being requested to hand in the UE. However, only the CWS with coverage in the physical region of the UE will be able to successfully respond to the request, and the other forked RUA connect will fail without negatively impacting hand-in.

In some embodiments, when a PCI conflict is detected, a handover request may be forked. Specifically, the handover request may be sent from the source cell to all cells known to the source cell that have that PCI. Two or more handover requests, then, may be created. However, only one handover request will ultimately be met/satisfied, because the receiving cell will determine either that the cell does contain the UE identified in the request and return a handover acknowledgement message, or that the cell does not contain the UE identified in the request and will fail and/or not return a handover acknowledgement message. The handover request may be sent either via X2 or S1, in some embodiments.

In small cell deployments there is a high probability of the PCI reuse—similar to PCI conflict—although PCI conflict normally means small cells are close and there is a problem with UE sync up. So in case of the PCI reuse core network becomes confused on the reported target handover cell site, as it doesn't know any better than PCI (physical cell id) reported by UE. One commonly deployed method—network gets Global Cell Id (CGI) report from UE and uses global cell id instead of PCI to resolve ambiguity—CGI is unique. Here a different and alternative method is proposed—we fork the handover message to all PCI (in case of ambiguity) and wait for one the CWS (can be third party as well we don't care) returning acknowledge. As soon as we get it, we continue with the handover towards this specific small cell and drop other initiated handover sessions.

Further embodiments are contemplated. For example, algorithms for determining the intent of a user are contemplated, thereby enabling the network to determine whether hand-in is desired. As another example, an algorithm based on the path vector, OSPF path vector, or determined UE speed may be used for determining UE motion. As another example, admission priority may be influenced by one or more parameters. As another example, hand-in to a small cell may be rejected by immediately handing back to a macro, based on hand-in parameters. As another example, thresholds, such as reporting thresholds, cell selection thresholds, and handover thresholds, may be monitored and set to reduce undesirable hand-ins. As another example, the control plane for the UE may be anchored at the macro, while some hand-overs are handled transparently via the IuGw. As another example, a macro overlay network, wherein a macro cell has coverage co-extensive with the coverage area of the small cells, may be configured with different hand-in parameters, such as minimal small cell hand-in. As another example, topology gaps may be pre-configured to disallow handovers, such that if a network identifies the direction of travel of a UE as entering a small cell gap in coverage, handover from the macro is disallowed from certain source small cells or from the macro. Forking may involve creating more than one copy, in some embodiments.

Figure 15:
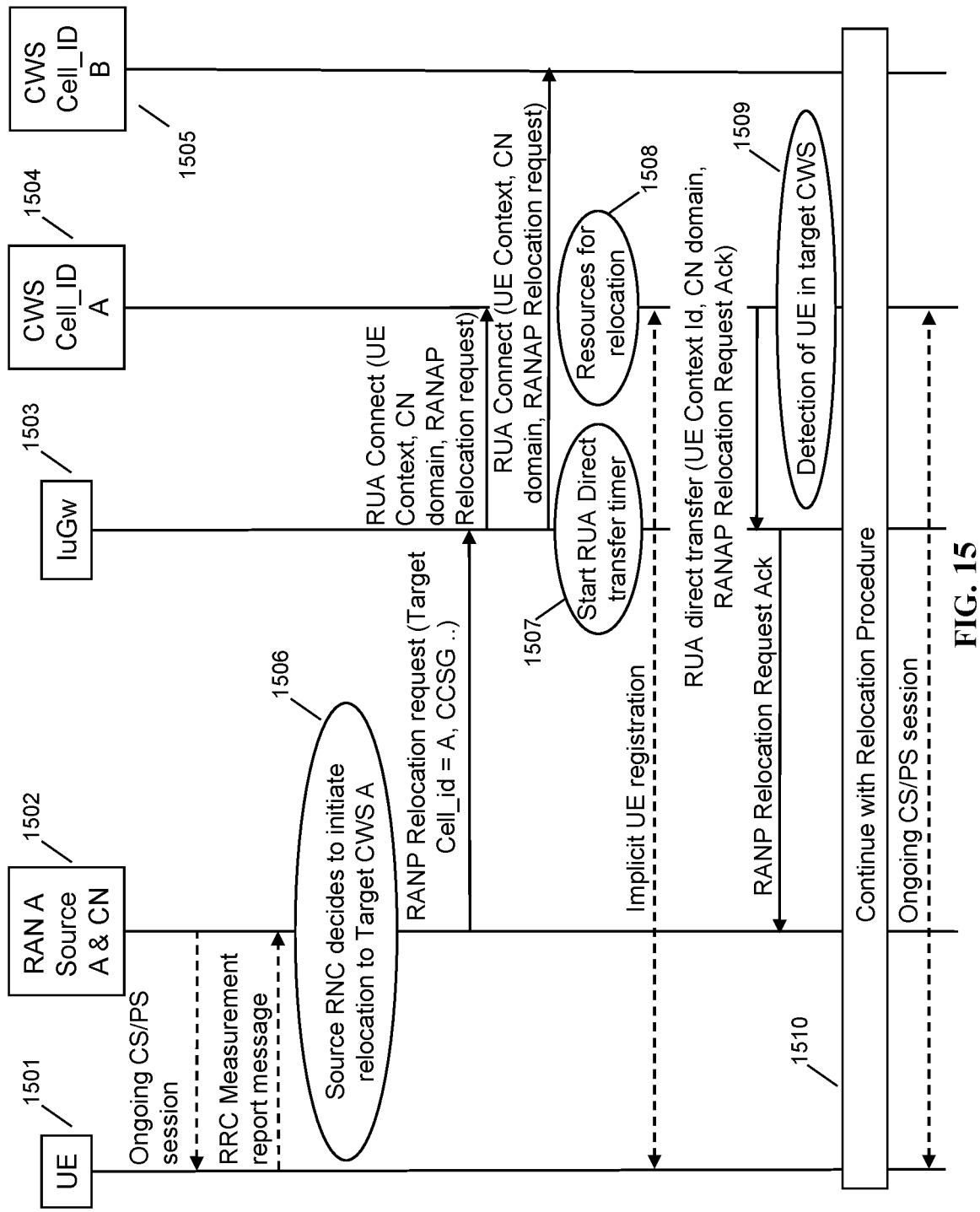
FIG. 15 is a signaling call flow showing handin with call connect message forking, in accordance with some embodiments.

FIG. 15 is a signaling call flow showing handin with call connect message forking, in accordance with some embodiments. UE 1501 is connected to macro RAN 1502, which is connected to a core network (not shown), and through IuGW 1503 to CWS Cell A 1504 and CWS Cell A 1505, both of which have the same Cell ID. At step 1506, the source cell initiates relocation. This results in a RANP Relocation Request being sent to the IuGW. The IuGW does not know which CWS is being requested, and as a result forks the request by sending a copy of the RUA connect request to each of cells 1504 and 1505. At step 1507, the IuGW starts a transfer timer. At step 1508, cell A allocates resources for the UE and at steps 1509 and 1510, the handover proceeds normally. By the operation of the handover and by cell 1504 returning messages, IuGW 1503 becomes aware that the UE is in cell 1504.

RTP Localization

The Real-time Transport Protocol (RTP) is a network protocol for delivering audio and video over IP networks. RTP is used extensively in communication and entertainment systems that involve streaming media, such as telephony, video teleconference applications, television services and web-based push-to-talk features. RTP is one of the technical foundations of Voice over IP (VoIP), and in this context is often used in conjunction with a signaling protocol such as the Session Initiation Protocol (SIP) which establishes connections across the network.

In some embodiments, RTP flows may be directed from one endpoint to another endpoint within the control of the Parallel Wireless HNG, without requiring a session border controller to identify the need for, and provide, hairpin routing. The problem that exists in some situations is that 3G calls require a session border controller even when the call is locally terminated. However, by providing this functionality at the edge of the network, the network may achieve better latency and other advantages.

The edge of network node may be the CWS or the Parallel Wireless HNG/Parallel Wireless HNG. The Parallel Wireless HNG/Parallel Wireless HNG may perform functions including endpoint lookup of call recipient within local area based on phone number; redirection of 3G call audio to call recipient over RTP within a zone; and call termination. No MSC need be involved. The call may be packet-switched or circuit-switched. The call can be a CSFB call; it may be terminated as CS by the CWS at either end of the call. Depending on the location of the edge of network node, this function may be performed within a group, across groups, or within a single CWS. Lawful intercept, 3-way calling, hold, conferencing, etc. may be managed by the Parallel Wireless HNG. The advantages may include lower call establishment latency, (lower call latency?), less load at upstream nodes, higher throughput, reduced backhaul requirements, and improved voice quality as a result of the above.

In additional embodiments, UE-mobility from one small-cell connected to one Super-cell to another small-cell connected to a different Super-cell are described, where these Super-Cells are registered with same HNBGW. Each super-cell is a Iuh-back-to-back agent and abstracts the small-cells connected to it toward the external HNBGW. Inbound mobility of UEs from a 3G nodeB via a Macro-RNC to a 4G small cell virtualized by an HNG via an external HNBGW is also described. Systems and methods for providing inbound mobility are disclosed, including by doing proprietary changes to SRNS Relocation message in 3G.

Small Cells could be clustered and represented to external world by a logical super-Cell. The super-cell itself acts as a small Cell to the external entities like HNBGW in case of 3G or to MME in case of LTE. The small-cells connected to these super-cells are hidden from HNBGW or MME.

In 3G-system, the super-cell is an Iuh back-to-back agent and registers with external HNBGW with its own 28 bits super-Cell-Id. The HNBGW is in the core network. Additionally, one or more small cells are connected to the super-cell Iuh B2BUA and are virtualized by the B2BUA. The HNBAP registrations from the one or more small-cells attached to the super-cell are not forwarded by the super-cell to the HNBGW in the core network, as only one HNBAP Registration is permitted over one Iuh-interface. Hence, these small-cells, represented by a super-cell, remain virtualized and isolated from external HNBGW via the Iuh proxy. This results in the HNBGW being aware of cell-Id of only the super-cell itself, and not the cell ID of the small cells. The UEs attaching to these small-cells are therefore, considered to be emanating from Super-cells in north-bound interface towards HNBGW.

Each small-cell covers a region based on its power capacity. Multiple small-cells are deployed closely to cover the entire geographical area. There shall be UE handovers across these closely packed small-cells and thus UE-mobility feature is an important aspect of small cells deployment. However, in this scenario, UE mobility can take place only within the small-cells connected to one Super-cell, and mobility is not clearly enabled for handovers from small-cell connected to one Super-cell to small-cell connected to another Super-Cell, or from small-cell to Macro-RNC or from Macro-RNC to these small-cells, since the cell ID of the small cells is not known by the HNBGW and core network.

Parallel Wireless HetNet Gateway can represent multiple Super-cells. Thus, these multiple Super-cells could reside on same physical box as present in Parallel Wireless HetNet Gateway or could be present across multiple Parallel Wireless HetNet Gateway boxes.

The UE mobility within small-cell connected to same Super-cell can be handled within the cluster either by IuRH or SRNS Relocation procedure in 3G or X2 or S1AP handover in LTE without involving HNBGW or MME. The out-bound mobility from small-cells to macro-RNC is also feasible using the SRNS-Relocation procedure or S1AP handover.

However, any inbound mobility to the small-cell connected to one Super-cell from another small-cell connected to another Super-cell may not be possible, because intermediary nodes like HNBGW may not be aware of the Cell-identity of these hidden small-cells and thus, won't be able to route the Relocation Request message to the correct Super-Cell.

There is a need to address the problem of inbound mobility from Macro-to-hidden-small cells and UE-mobility from one small-cell connected to one Super-Cell to small-cell connected to another super-Cell.

In some embodiments, considering 3G small-cells, HNBGW learns about the cell-Id of Super-cell during the HNBAP HNB-Registration procedure. HNBGW is not aware of small-cells hidden within these super-cells, because the HNB registration from small-cells attached to these super-cell are not forwarded by the super-cells to HNBGW.

Parallel Wireless HetNet Gateway (HNG) has a centralized entity to maintain and learn about the Cell-identity of Super-Cell based on the Cell-identity of small-cell attached to Super-cell. These super-cells could reside on any HNG box. The centralized entity can be in the core network or can be at the HNG itself.

Parallel Wireless Hetnet Gateway (HNG) also has the characteristic to represent multiple Super-Cells to the external HNBGW. HNG can thus, address the UE-mobility within the Super-Cell without informing external HNBGW.

When there is UE-mobility across small-cells connected to two different Super-cell attached to HNG, the HNG queries this centralized entity and replaces the target-cell-id value present in outbound Relocation required with the Cell-Id of Target-Super-cell. In addition, HNG also creates an entry to a lookup table. This lookup table is based on UE-IMSI, cell-identity of target-small-cell, and cell-identity of target-Super-Cell.

The Relocation required message emanating from (sent/forwarded from) the HNG thus is rewritten to contain target-Cell-Id of target-Super-Cell.

As the HNBGW is already aware of the cell-Identity of Super-cell, the HNBGW shall route the Relocation Request message to target-Super-Cell residing at Parallel Wireless HNG.

As part of its proxying function, HNG does the lookup based on IMSI in the lookup table, finds an IMSI entry, modifies the target-cell-Id present in Relocation Request with the target-cell-Id of hidden Small-cell and continues with the Relocation procedure.

A decentralized function could also be used, where each HNG in the network is responsible for only a particular set of IMSIs and can be queried to determine whether the required cell identity for a particular IMSI is available at that HNG.

Additionally, for addressing the UE-mobility from Macro-RNC-to-the hidden small-cells, it is proposed that the external HNBGW may store identity information of these Super-Cell, i.e., the RNC ID. HNBGW can do the Relocation Request routing based on the logical RNC-Id portion of target-Cell-Id instead of doing lookup based on whole Cell-Id. Once, the Relocation Request reaches the Parallel Wireless HetNet Gateway using the RNC ID, the smart application at the HNG shall complete the Relocation procedure using the IMSI.

Thus, when there is UE-mobility from one small-cell to another small-cell connected to different Super-Cell, then external HNBGW needs to be involved in the UE-mobility. External HNBGW is aware of the target-Cell-Id of Super-Cells only and thus, it is not possible for it to identify a correct Super-Cell when it receives a Relocation-Request with target-CWS Cell-id. Thus, this invention is added to solve this problem.

The proposed changes enable UE-mobility across multiple Super-Cells. HNBGW can forward the Relocation-Request to HNG only if it has the target-Cell-Id entry in its lookup table. The alternate approach where all the small-cell connected to same Super-Cell sharing the same Cell-Id puts a lot of computation complexities at HNG like Relocation forking, etc. Assumption is that external HNBGW is aware of Cell-Id of target-HNB and routes Relocation Request based on target-Cell-Id based lookup table.

Figure 16A:
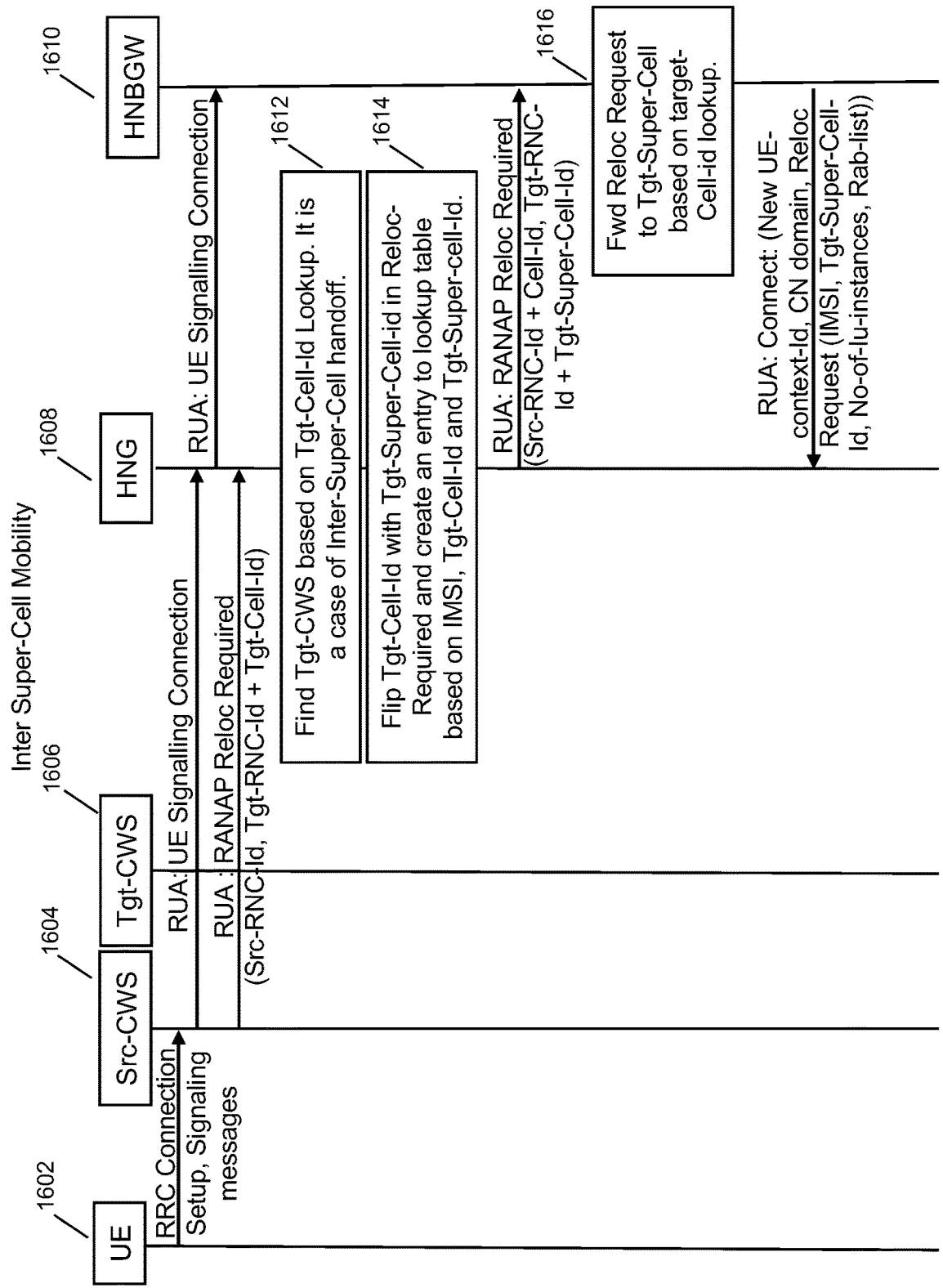
FIG. 16 is an exemplary call flow showing inter-super cell mobility in accordance with some embodiments.
Figure 16B:
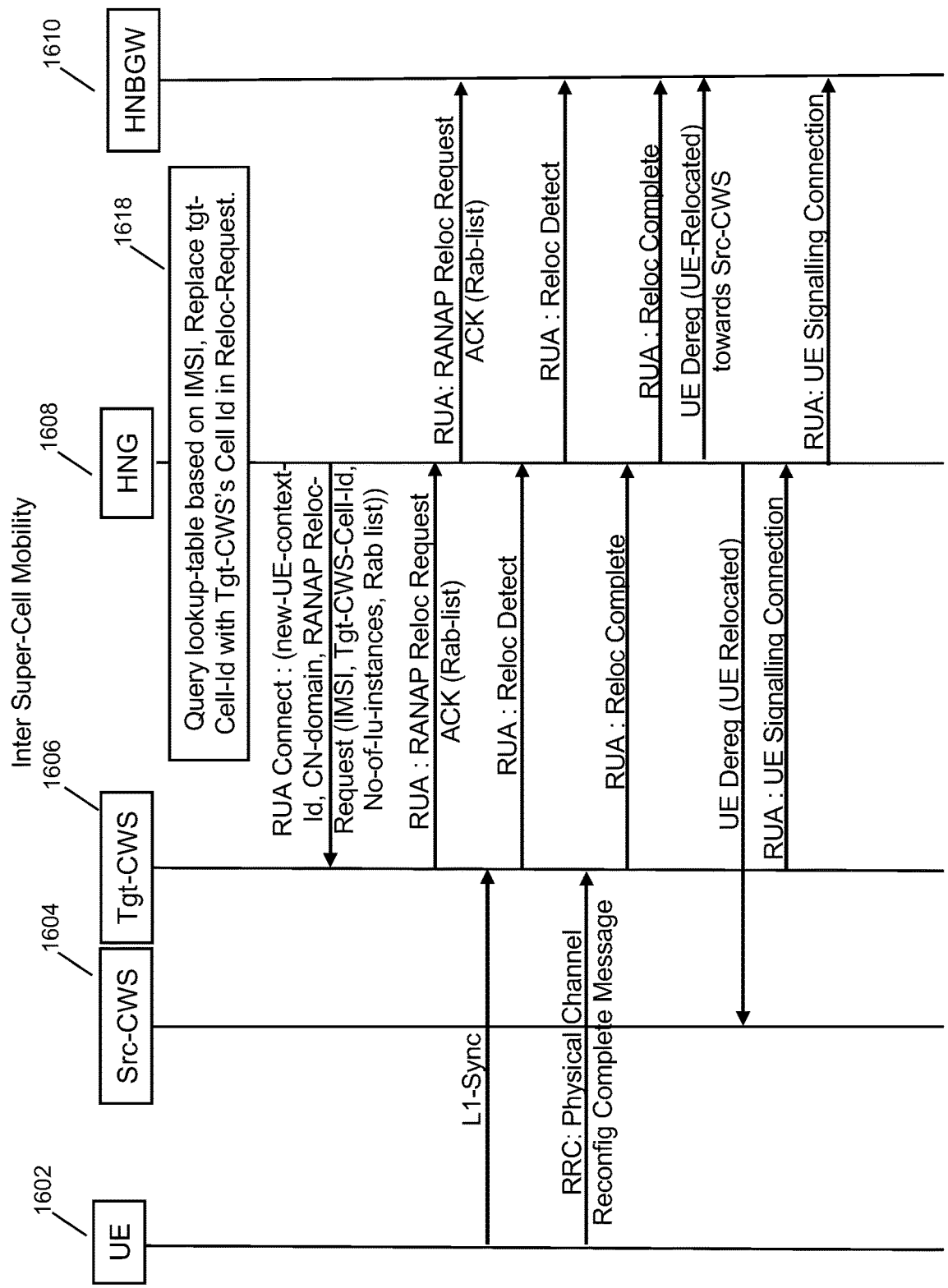

FIG. 16 is an exemplary call flow showing inter-super cell mobility in accordance with some embodiments. FIG. 16 is split into FIGS. 16A and 16B.

In FIG. 16A, according to some embodiments, a UE 1602 is attached to source CWS 1604 and determines in conjunction with a target CWS 1606 that a handover from source CWS 1604 to target CWS 1606 is appropriate. Source CWS is a small cell in a super cell (not shown). Target CWS is a home nodeBs coordinated in a second super cell by Parallel Wireless HetNet Gateway (HNG) [TM] 1608. The UE may set up an RRC connection with the source base station 1604.

All communication with the core network, according to some embodiments, including HNBGW 1610, is mediated via the stateful proxy at HNG 1608, since HNBGW does not have the cell ID of target base station 1606. So in setup of the initial RRC connection, the UE may send a RANAP user adaptation (RUA) message to HNG 1608, which may then substitute its own ID for the cell ID of source CWS 1604, which is retained at HNG 1608. In the present embodiment, target base station 1606 is managed at HNG 1608 and the HNG 1608 has access to the cell ID. Each base station also has an RNC ID, which may be an actual RNC, a virtual RNC, or in some cases may be the address of the HNG, which may be performing an RNC role.

The UE may then attempt to connect to a target base station 1606 that has favorable characteristics. This requires HNG 1608 to receive a RANAP relocation required message, with the source RNC ID of CWS 1604, the target RNC ID of CWS 1606, and the target cell ID of CWS 1606. The HNG may send a RANAP relocation required message to the core network HNBGW 1610. However, at time 1612, it may identify the target CWS 1606 in a lookup table stored at HNG 1608, based on lookup of one or more identifiers (such as the target cell ID), and in the case that the target cell ID is known to be managed by the HNG 1608 or another virtualization gateway (stored with a flag), at time 1614, HNG 1608 may swap the target cell ID of 1606 for the ID of HNG 1608 (which is the target super cell ID) in the RANAP relocation required message. The HNG may also at that time create a lookup table entry to enable subsequent lookup, containing the UE's IMSI, the target cell ID (1606), and the target super cell ID (of the HNG 1608). This is retained for further use during the UE's session. Various proxying resources, such as state for managing the RANAP RUA message proxying and for tracking and mapping other handover messages for this UE, and other such session overhead resources, may also be set up at HNG 1608 during this time to facilitate the handover.

In some embodiments, both the source and the target cell ID may be swapped and tracked, such as for example when both source nodeB 1604 and target nodeB 1606 are managed by HNG 1608 (however, in the typical case this type of handover is an intra-super cell handover and would not require any signaling to be sent to the core network).

In some embodiments, the source and target nodeBs may be inter-super cell, but managed by different HNGs, and the HNG 1608 may be aware that the target cell is managed by a super cell, such as based on lookup of the target cell ID or based on the target RNC ID, or by preconfiguration, or via another method, and in such instances the HNG 1608 may exchange proprietary messages to other HNGs to obtain the mapping of target cell ID and target super cell ID.

At time 1616, the relocation request is forwarded to the HNBGW with the source RNC ID and source cell ID, but with the target RNC ID and the target super cell ID, in some embodiments, and the HNBGW 1610 performs the handover (RUA connect messaging, etc.) using the target super cell ID, which causes the target super cell (in this case, HNG 1608) to receive the handover message.

Continuing in FIG. 16B, at 1618, the HNG 1608 subsequently queries the lookup table based on IMSI to subsequently replace the target cell ID field (which contains the target super cell ID) with the target CWS's ID in the relocation request and other messages.

In some embodiments, the HNG may be a coordinating node for eNodeBs in addition to home nodeBs. In some embodiments, the HNG may be a virtualization node. The HNG may provide stateful proxying or back-to-back user agent (B2BUA) functionality for a plurality of eNodeBs, small cells, nodeBs, gNodeBs, 5G nodeBs, Wi-Fi access points, or other access nodes, while presenting a HNB interface to the HNBGW for those access nodes. Where 3G is contemplated herein, the equivalent systems and methods in 4G are also contemplated as a parallel modality. Where Iuh is contemplated, other interfaces are contemplated, such as Iur, etc.

Figure 17:
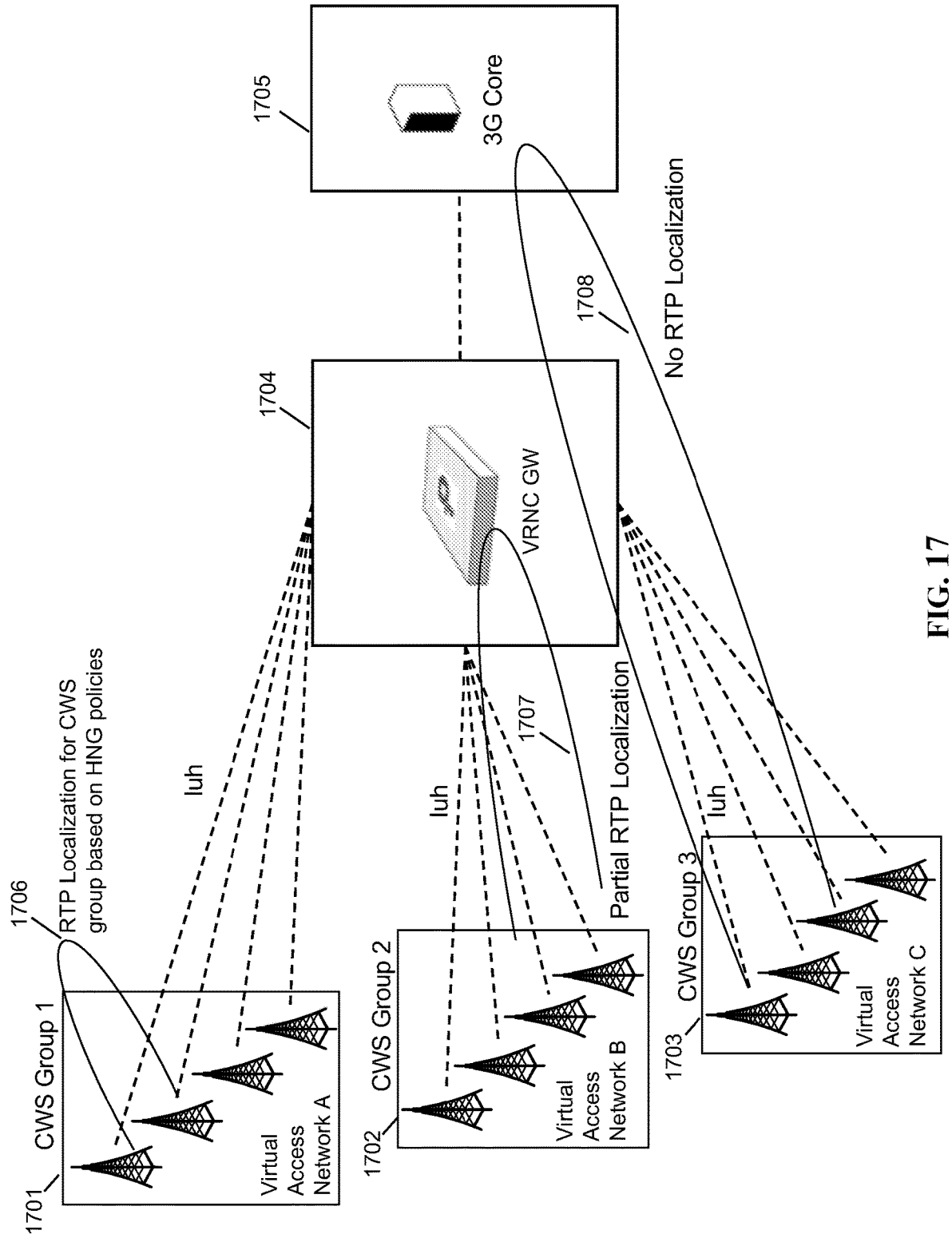
FIG. 17 is a schematic network architecture diagram showing RTP localization, in accordance with some embodiments.

FIG. 17 is a schematic network architecture diagram showing RTP localization, in accordance with some embodiments. CWS group 1/Virtual access network A 1701 is a group of CWSes managed by HNG 1704. CWS Group 2/Virtual access network B 1702 is another such group, as is CWS Group 3/Virtual access network C 1703. Also provided is 3G core 1705, which is in communication with HNG 1704. The HNG 1704 is an RNCGW and provides IuGW services. The HNG has an RTP localization policy, which is enforced at the HNG. During CS call setup, the HNG determines the need for RTP localization and instructs the CWS by changing IP and port. Complete RTP localization 1706 (the CWSes are directed to communicate directly without going through the HNG), partial RTP localization 1707 (through the HNG), or no RTP localization 1708 (through the core) is detected as a possible condition and enforced at the HNG. Detection may be based on CWS groups, whether the cell ID is the same, whether the target is managed by the same HNG, or other factors.

Figure 18:
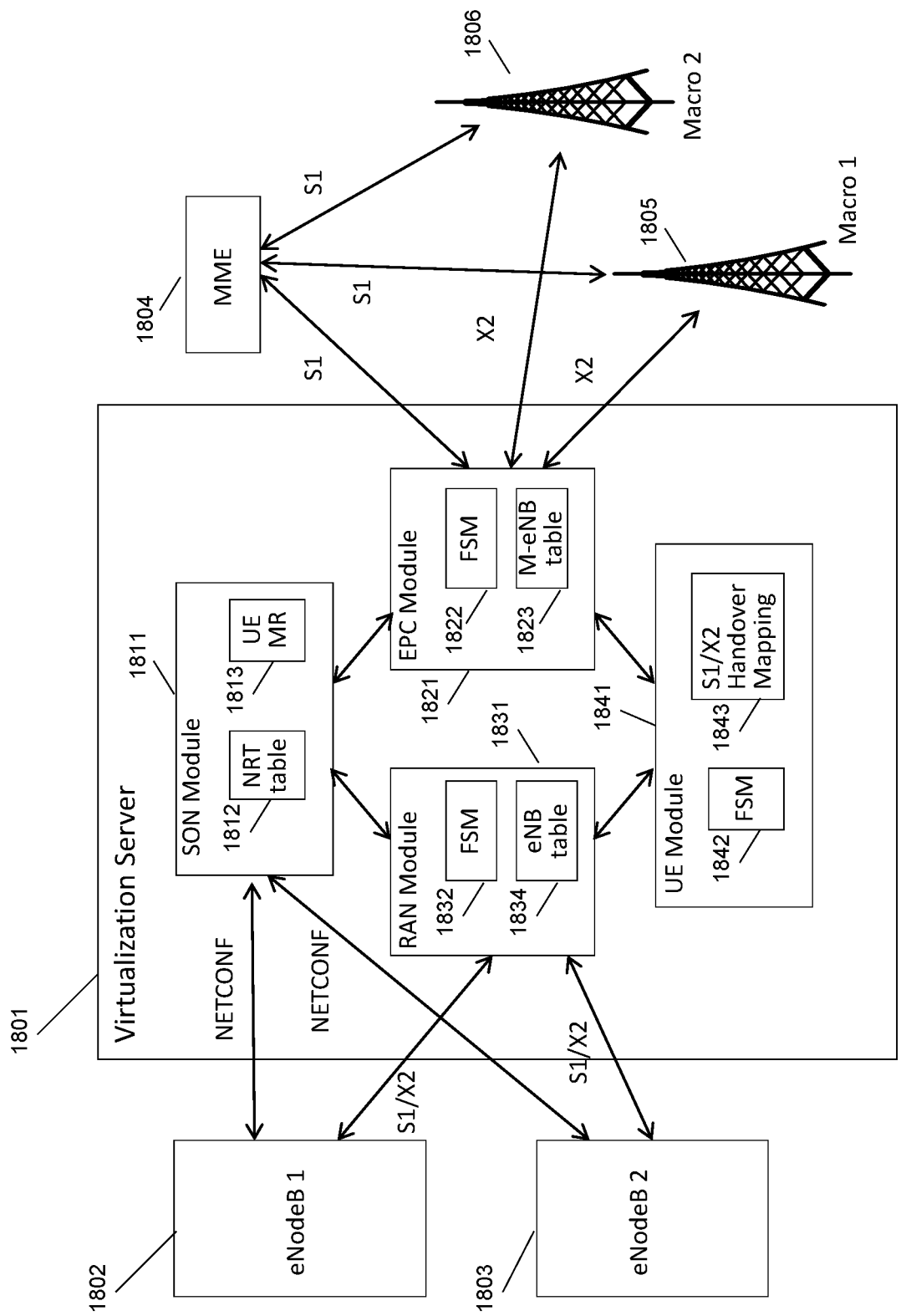
FIG. 18 is a schematic architecture diagram of an exemplary gateway, in accordance with some embodiments.

FIG. 18 is a schematic diagram of a base station management gateway in a Long Term Evolution (LTE) architecture, in accordance with some embodiments. Base station management server 1801 provides services to, and is coupled to, eNodeB 1 1802 and eNodeB 18 1803, on a RAN side of a network (i.e., inside of the gateway). Base station management server 1801 provides services to, and is coupled to, MME 1804, macro eNodeB 1805, and macro eNodeB 1806, on a core network side of the network (outside of the gateway). Base station management server 1801 corresponds to LAC 110, in some embodiments.

Within base station management gateway 1801 are self-organizing network (SON) module 1811, containing neighbor relation table (NRT) 1812 and UE measurement report processing module 1813; evolved packet core (EPC) module 1821, containing EPC finite state machine module 1822 and macro eNodeB table 1823; radio access network (RAN) module 1831, containing eNodeB finite state machine module 1832 and eNodeB table 1834; and user equipment (UE) module 1841, containing UE finite state machine module 1842 and S1/X2 handover mapping table 1843. Each of modules 1811, 1821, 1831, and 1841 are coupled to each other within base station management gateway 1801, and may execute on one or more shared processors (not shown) coupled with memory (not shown).

In some embodiments, SON module 1811 may perform NRT maintenance, load information processing and fractional frequency reuse (FFR) processing; RAN module 1831 may perform X2 association management with eNodeBs 1802, 1803; EPC module 1821 may perform X2 association management with macro eNodeBs 1805, 1806; and UE module may perform X2 handover and S1/X2 translation between eNodeBs 1802, 1803 and macro eNodeBs 1805, 1806. All the above managers/modules interact with each other to accomplish the assigned functionality.

Figure 19:
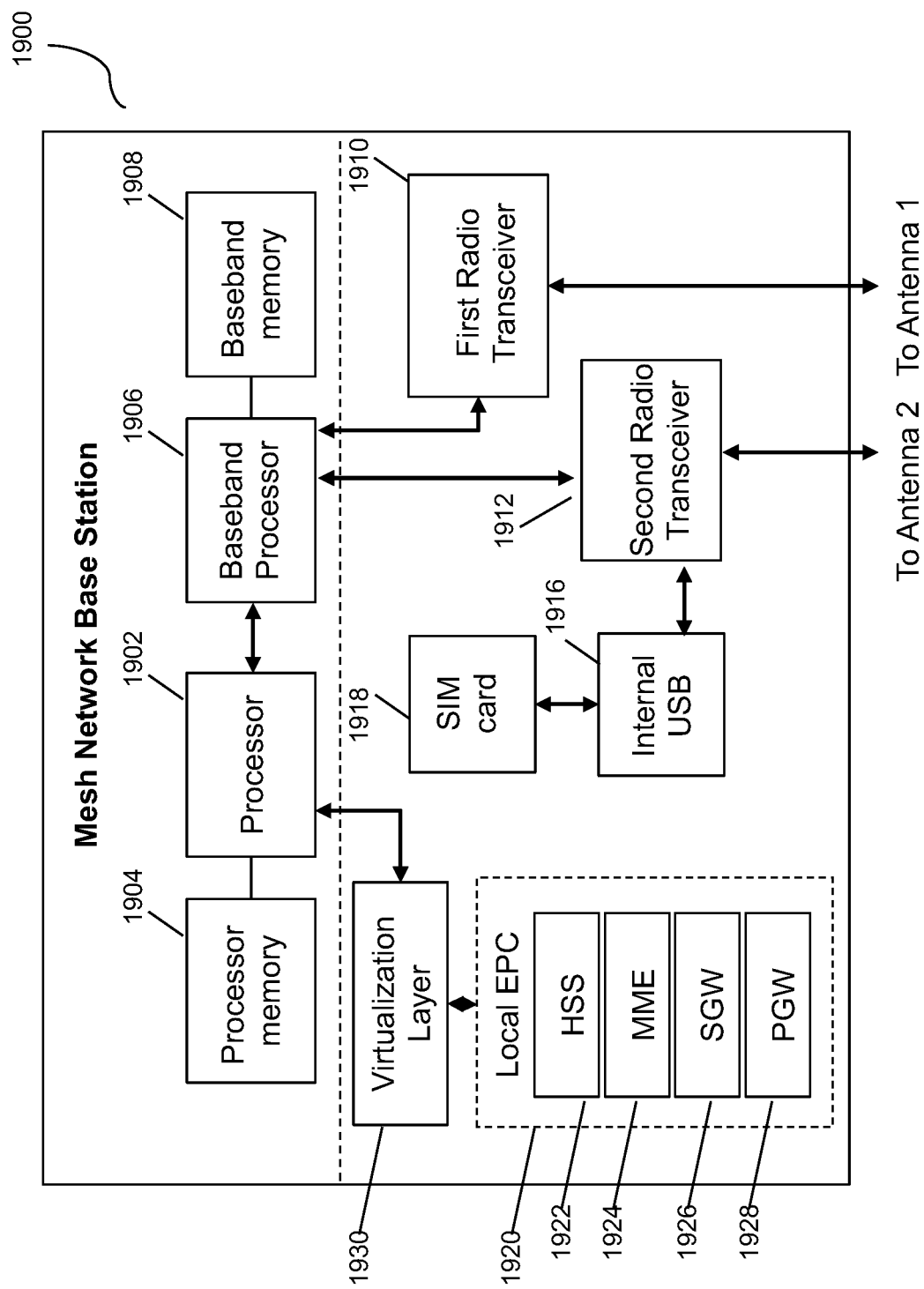
FIG. 19 is a schematic architecture diagram of an exemplary base station, in accordance with some embodiments.

FIG. 19 is a schematic diagram of a mesh network base station, in accordance with some embodiments. Mesh network base station 1900 may include processor 1902, processor memory 1904 in communication with the processor, baseband processor 1906, and baseband processor memory 1908 in communication with the baseband processor. Base station 1900 may also include first radio transceiver 1910 and second radio transceiver 1912, internal universal serial bus (USB) port 1916, and subscriber information module card (SIM card) 1918 coupled to USB port 1914. In some embodiments, the second radio transceiver 1912 itself may be coupled to USB port 1916, and communications from the baseband processor may be passed through USB port 1916.

A virtualization layer 1930 may also be included for mediating communications with an evolved packet core EPC, specifically including the core network EPC (not shown) and local evolved packet core (EPC) module 1920. Local EPC 1920 may be used for authenticating users and performing other EPC-dependent functions when no backhaul link is available. Local EPC 1920 may include local HSS 1922, local MME 1924, local SGW 1926, and local PGW 1928, as well as other modules. Local EPC 1920 may incorporate these modules as software modules, processes, or containers. Local EPC 1920 may alternatively incorporate these modules as a small number of monolithic software processes. Virtualization layer 1930 and local EPC 1920 may each run on processor 1902 or on another processor, or may be located within another device.

Processor 1902 and baseband processor 1906 are in communication with one another. Processor 1902 may perform routing functions, and may determine if/when a switch in network configuration is needed. Baseband processor 1906 may generate and receive radio signals for both radio transceivers 1910 and 1912, based on instructions from processor 1902. In some embodiments, processors 1902 and 1906 may be on the same physical logic board. In other embodiments, they may be on separate logic boards.

The first radio transceiver 1910 may be a radio transceiver capable of providing LTE eNodeB functionality, and may be capable of higher power and multi-channel OFDMA. The second radio transceiver 1912 may be a radio transceiver capable of providing 3GPP WCDMA functionality. Both transceivers 1910 and 1912 are capable of receiving and transmitting on one or more bands. In some embodiments, transceiver 1910 may be capable of providing both LTE eNodeB and LTE UE functionality, and transceiver 1912 may be capable of UMTS BTS functionality, UMTS UE functionality, or both. The transceivers may be switched. Transceiver 1910 may be coupled to processor 1902 via a Peripheral Component Interconnect-Express (PCI-E) bus, and/or via a daughtercard. As transceiver 1912 is for providing LTE UE functionality, in effect emulating a user equipment, it may be connected via the same or different PCI-E bus, or by a USB bus, and may also be coupled to SIM card 1918.

SIM card 1918 may provide information required for authenticating the simulated UE to the evolved packet core (EPC). When no access to an operator EPC is available, local EPC 1920 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1900 is not an ordinary UE but instead is a special UE for providing backhaul to device 1900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1910 and 1912, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1902 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1902 may identify the appropriate network configuration, and may perform routing of packets from one network interface to another accordingly. Processor 1902 may use memory 1904, in particular to store a routing table to be used for routing packets. Baseband processor 1906 may perform operations to generate the radio frequency signals for transmission or retransmission by both transceivers 1910 and 1912. Baseband processor 1906 may also perform operations to decode signals received by transceivers 1910 and 1912. Baseband processor 1906 may use memory 1908 to perform these tasks.

Alternatives

In the present disclosure, the words "NodeB" or "eNodeB" are used to refer to a cellular base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), as well as any equivalents.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at a multi-radio access technology node (multi-RAT) node, instead of at a base station management gateway. The base station management gateway may substantially take the form of the described Parallel Wireless HetNet Gateway. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the base station management gateway, within a function performing radio resource allocation and coding selection, or at another location. In some embodiments, a base station management gateway may identify and initiate power adjustments to improve channel quality.

In some embodiments, the mesh network nodes may provide complete or partial guesses at what paths are the optimal or best paths during a particular time interval, and may be enabled to send messages back to the base station management gateway to communicate these complete or partial guesses.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
    receiving a relocation request message at a home nodeB gateway (HNBGW), the HNBGW coupled to an operator core network, wherein the relocation request message includes a target super cell identifier and a user equipment (UE) identifier;
    sending a second relocation request message from the HNBGW to a coordinating node, the coordinating node having its identifier as the target super cell identifier;
    querying a lookup table at the coordinating node using the UE identifier to determine a target cell identifier;
    replacing, by the coordinating node, in the second relocation request message, the target super cell identifier with the target cell identifier to create a third relocation request message; and
    sending, by the coordinating node, the third relocation request message to a target cell identified by the target cell identifier;
    wherein cells are clustered, virtualized, and represented as a logical super cell, wherein the coordinating node is a back-to-back user agent and registers with the HNBGW with the target super cell identifier, and acts as a cell to the HNBGW, and wherein at least one cell connected to the coordinating node is hidden from the HNBGW, and wherein the back-to-back user agent abstracts small cells connected to it towards the HNBGW;
    maintaining and learning about a cell-identity of a logical super-cell based on a cell-identity of a small-cell attached to the logical super-cell; and
    for UE mobility across small-cells connected to two different super-cells, replacing a target-cell-ID value in an outbound relocation message with a cell ID of a target super-cell; and
    creating an entry in a lookup table based on UE-IMSI, cell-identity of target-small-cell, and cell identity of target-Super-Cell.

2. The method of claim 1, further comprising receiving the relocation request message at the HNBGW via a signaling connection between the target cell and the coordinating node.

3. The method of claim 1, further comprising proxying requests at the coordinating node to relocate the UE to the target cell.

4. The method of claim 1, wherein the UE identifier is an international mobile subscriber identity (IMSI).

5. The method of claim 1, wherein the coordinating node is a virtualization server configured to act as a proxy and back-to-back user agent for connecting a plurality of cells to the operator core network.

6. The method of claim 1, wherein the coordinating node maintains a list of cell identifiers for a plurality of cells.

7. The method of claim 1, wherein the coordinating node is a home eNodeB gateway (HeNBGW).

8. A method, comprising:
    receiving a handover request from a home NodeB gateway (HNBGW) at a coordinating node, the handover request having a user equipment (UE) identifier and having as a destination address an address managed by the coordinating node;
    querying a lookup table at the coordinating node using the UE identifier to retrieve a target cell identifier of a target cell, visibility of the target cell being managed by the coordinating node;
    swapping, by the coordinating node, in a message, the destination address for the target cell identifier; and
    forwarding, by the coordinating node, the message to the target cell,
    wherein cells are clustered, virtualized, and represented as a logical super cell, wherein the logical super cell is a back-to-back agent and registers with the HNBGW with its own super-Cell-Id, and acts as a cell to the HNBGW and wherein cells connected to the logical super cell are hidden from the HNBGW, wherein the back-to-back user agent abstracts small cells connected to it towards the HNBGW;
    maintaining and learning about a cell-identity of a logical super-cell based on a cell-identity of a small-cell attached to the logical super-cell;
    for UE mobility across small-cells connected to two different super-cells, replacing a target-cell-ID value in an outbound relocation message with a cell ID of a target super-cell; and
    creating an entry in a lookup table based on UE-IMSI, cell-identity of target-small-cell, and cell identity of target-Super-Cell.

9. The method of claim 8, wherein the address managed by the coordinating node is a radio network controller (RNC) identifier.

10. The method of claim 8, wherein the request is a handover request or a radio access network application part (RANAP) relocation request.

11. The method of claim 8, wherein the UE identifier is an international mobile subscriber identity (IMSI) and wherein the coordinating node is a virtualization server configured to act as a proxy and back-to-back user agent for connecting a plurality of cells to the operator core network, and wherein the coordinating node is a home eNodeB gateway (HeNBGW).

* * * * *